(12) United States Patent
Kuroda et al.

(10) Patent No.: US 7,653,290 B2
(45) Date of Patent: Jan. 26, 2010

(54) INFORMATION OUTPUTTING APPARATUS AND INFORMATION OUTPUTTING METHOD, INFORMATION RECORDING APPARATUS AND INFORMATION RECORDING METHOD, INFORMATION OUTPUTTING RECORDING SYSTEM AND INFORMATION RECORDING MEDIUM

(75) Inventors: Kazuo Kuroda, Tokorozawa (JP);
Yoshiaki Moriyama, Tokorozawa (JP);
Takashi Hashimoto, Tokyo-to (JP);
Akihiko Naito, Tokyo-to (JP)

(73) Assignee: Pioneer Corporation, Tokyo (JP)

( * ) Notice: Subject to any disclaimer, the term of this patent is extended or adjusted under 35 U.S.C. 154(b) by 794 days.

(21) Appl. No.: 09/885,005

(22) Filed: Jun. 21, 2001

(65) Prior Publication Data

US 2002/0018647 A1 Feb. 14, 2002

(30) Foreign Application Priority Data

Jun. 22, 2000 (JP) .......................... P2000-187355

(51) Int. Cl.
*H04N 5/91* (2006.01)
(52) U.S. Cl. .......................... 386/124; 386/68; 386/98; 725/139; 725/141
(58) Field of Classification Search .............. 386/1, 386/45, 68–70, 95, 125–126, 124, 98; 725/139, 725/141
See application file for complete search history.

(56) References Cited

U.S. PATENT DOCUMENTS

| 5,170,388 | A | | 12/1992 | Endoh | |
| 5,363,362 | A | * | 11/1994 | Maeda et al. | 369/47.33 |
| 5,661,715 | A | * | 8/1997 | Blaukovitsch | 369/275.4 |
| 5,946,447 | A | * | 8/1999 | Nakagawa et al. | 386/95 |
| 5,973,681 | A | * | 10/1999 | Tanigawa et al. | 715/716 |
| 6,201,928 | B1 | * | 3/2001 | Nonomura et al. | 386/68 |
| 6,212,208 | B1 | * | 4/2001 | Yoneda et al. | 370/538 |
| 6,400,667 | B1 | * | 6/2002 | Utsumi et al. | 369/53.34 |
| 6,549,496 | B2 | * | 4/2003 | Kuroda et al. | 369/47.27 |
| 6,556,775 | B1 | * | 4/2003 | Shimada | 386/121 |
| 7,305,698 | B1 | * | 12/2007 | Tanigawa et al. | 725/135 |
| 2003/0133387 | A1 | * | 7/2003 | Ishida et al. | 369/59.25 |

FOREIGN PATENT DOCUMENTS

| CN | 1250935 A | 10/1999 |
| JP | 0-272445 A | 10/1995 |
| JP | 7-272445 | 10/1995 |
| JP | 09-270790 | 10/1997 |

(Continued)

OTHER PUBLICATIONS

Office Action dated Mar. 25, 2008 in Japanese Application No. 2000-187355.
Yoshio Sugimori et al., "Transmission of Musical Information in a Teletext Multiplexed Boradcasting System", XP11180232, Jun. 17, 1983; pp. 213-216.

(Continued)

*Primary Examiner*—Thai Tran
*Assistant Examiner*—Helen Shibru
(74) *Attorney, Agent, or Firm*—Nixon & Vanderhye, PC

(57) ABSTRACT

An example outputting apparatus repeatedly transmits contents such as music or movies reproduced a player while attaching order information such as sector address numbers to the contents. An example recording apparatus records the contents on a recording medium such as a DVD based on the transmitted order information.

7 Claims, 15 Drawing Sheets

S

FOREIGN PATENT DOCUMENTS

| | | |
|---|---|---|
| JP | 2000-036184 | 2/2000 |
| JP | 2000-155734 | 6/2000 |
| JP | 2000-040300 | 8/2000 |
| KR | 0070315 | 8/1993 |

OTHER PUBLICATIONS

Communication pursuant to Article 94(a) EPC in EP 01 305 420.0-1247.

* cited by examiner

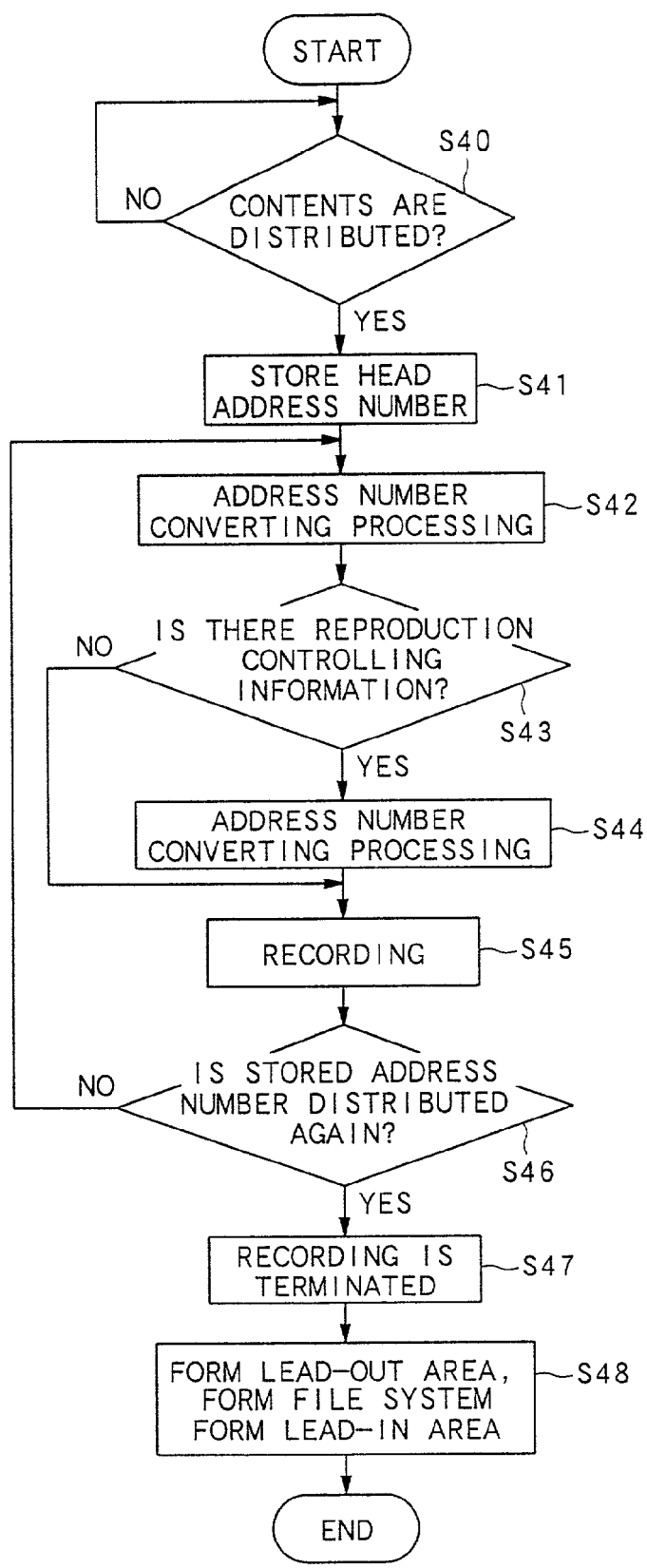

INFORMATION OUTPUTTING APPARATUS AND INFORMATION OUTPUTTING METHOD, INFORMATION RECORDING APPARATUS AND INFORMATION RECORDING METHOD, INFORMATION OUTPUTTING RECORDING SYSTEM AND INFORMATION RECORDING MEDIUM

BACKGROUND OF THE INVENTION

1. Field of the Invention

The present invention relates to a technical field of an information outputting apparatus and an information outputting method, an information recording apparatus and an information recording method and an information recording medium. More particularly, the present invention relates to a technical field of an information outputting apparatus and an information outputting method in which the transmitting and receiving of various information between the information outputting apparatus and an information recording apparatus, which are placed from a distance, are possible, an information recording apparatus and an information recording method and an information recording medium in which a control program for outputting the foregoing information or recording the foregoing information is recorded.

2. Description of the Related Art

As the base of development of a network in a field of an information communication in recent years, it has been generalized that the information with regard to music, a movie or the like (hereinafter referred to contents as necessary) is distributed through electric communication lines such as the Internet lines, the cable television lines or the like and the foregoing information is recorded in an information recording medium such as an optical disk or the like.

In the above case, in the above described conventional contents distributing system, it is general that the same contents are repeatedly distributed in a predetermined period in a distributing side and these distributed contents are obtained through the above described electric communication lines in a recording side, so that they are recorded in order of obtaining.

However, in the above described conventional method of distributing and recording the contents, it is natural that the recording starts from a head of the desired content in the recording side. Therefore, if the middle part of the foregoing desired contents has been distributed at a timing for starting the recording at the recording side, a user must wait ready until the distribution will start again from its head. As a result, the conventional method of distributing and recording the contents has a problem so that it takes an unnecessary time in order to record the desired contents.

SUMMARY OF THE INVENTION

The present invention has been made taking the foregoing problem into consideration, an object of which is to provide an information outputting apparatus and an information outputting method, which is capable of starting the recording without waiting until the head of the contents is distributed again in the case of recording the foregoing contents, which has been repeatedly distributed and is capable of recording the contents so that it can reproduce them in accordance with the original composition order thereof, an information recording apparatus and an information recording method and an information recording medium in which a control program for outputting the foregoing information or recording the foregoing information is recorded.

The above object of the present invention can be achieved by an information outputting apparatus of the present invention. The information outputting apparatus is provided with: an outputting device for outputting main information composed of a plurality of partial information to an information recording apparatus together with order information, which shows configuration order of said respective partial information in said main information, along a reproduction time series in said main information; and a controlling device for controlling the outputting device so as to repeatedly perform said outputting operation with respect to the same said main information and said order information.

According to the present invention, since the order information is outputted together with the main information, even when the recording is started from the middle part of the main information to be outputted upon recording the outputted main information, it is possible to record the main information so as to be reproduced in accordance with the original composition order thereof.

Accordingly, even in the case that the main information, which has been repeatedly outputted, is recorded in the recording medium, it is possible to start the recording without waiting that the head of the main information is outputted again and the contents are capable of being recorded so as to be reproduced on the code of the original configuration order.

In one aspect so the present invention, said information recording apparatus records said outputted main information in a recording medium by using said outputted order in formation so that said main information is reproduced on the basis of said order information.

According to this aspect, even when the recording is started from the middle part of the main information to be outputted upon recording the outputted main information in the recording medium by using the order information, it is possible to record the main information so as to be reproduced in accordance with the original composition order thereof.

In another aspect of the present invention, said main information is compressed having no relation to a time axis.

According to this aspect, it is possible to output a large amount of main information to the information recording apparatus in a short period of time.

In another aspect of the present invention, said outputting device is further provided with a distributing device for distributing said main information and said order information to said information recording apparatus through telecommunication lines.

According to this aspect, since the main information and the order information are distributed through the electric communication lines, even when the information outputting apparatus and the information recording apparatus are placed apart, it is possible to rapidly output the main information and the order information and to transmit them.

In another aspect of the present invention, said telecommunication lines comprise at least one of a cable television circuit, the Internet lines, satellite broadcasting circuit and ground-based digital broadcasting circuit.

According to this aspect, it is possible to transmit the main information and the order information rapidly and reliably.

In another aspect of the present invention, said outputting device also outputs reproduction controlling information for controlling a reproduction manner of said main information recorded in said recording medium to said information recording apparatus together with said main information and said order information.

According to this aspect, it is possible to reproduce the main information in various reproduction manners on the basis of the reproducing control information upon reproducing the main information after outputting it to the information recording apparatus and recording it in the recording medium.

In another aspect of the present invention, said main information includes regulating information for regulating the number of times for copying after said main information is recorded in said recording medium, said outputting device further comprises a changing device for uniformly changing said respective order information in association with a content of the included regulating information and generating a changing order information, and said outputting device outputs said changing order information to said information recording apparatus together with said main information.

According to this aspect, by confirming the state of the combination of the foregoing regulating information and the changing order information upon reproducing the main information, which is recorded in the recording medium by the information recording apparatus, it is possible to prevent the main information, which is illegally copied, from being illegally reproduced.

In another aspect of the present invention, said partial information comprises an information sector, and said order information is any one of sector address information in association with said respective information sectors and relative information which is related to said sector address information.

According to this aspect, since sector address information or mutual relation information is outputted together with the main information composing of the information sector, even when the recording is started from the middle part of the main information, it is possible to record the main information so as to be reproduced in accordance with the original composition order thereof.

The above object of the present invention can be achieved by an information recording apparatus of the present invention for recording main information and order information, which are outputted from an information outputting apparatus, in a recording medium. The information outputting apparatus is provided with: an outputting device for outputting said main information composed of a plurality of partial information to said information recording apparatus together with said order information, which shows configuration order of said respective partial information in said main information, along a reproduction time series in said main information; and a controlling device for controlling the outputting device so as to repeatedly perform said outputting operation with respect to the same said main information and said order information. The information recording apparatus is provided with: an obtaining device for obtaining said outputted main information and said outputted order information; and a recording device for recording said obtained main information in said recording medium by using said obtained order information in the order of obtaining.

According to the present invention, the obtained main information is recorded in the recording medium in the order of obtaining by using the order information, so that it is possible to record the main information so as to be reproduced in accordance with the original composition order thereof even when the main information is recorded in the recording medium from the middle part of the main information during being outputted.

In one aspect of the present invention, address information showing a recording position on said recording medium is recorded in advance on said recording medium, and said recording device records said partial information in association with said order information on a recording position on said recording medium, which is indicated by said address information associated with said obtained order information.

According to this aspect, the main information in association with the foregoing order information is recorded in the recording position, which is represented by the address information in association with the order information, so that it is possible to record the main information so as to be reproduced by a simple processing in accordance with the original composition order thereof.

In another aspect of the present invention, said partial information comprises an information sector, and said order information is any one of sector address information in association with said respective information sectors and relative information which is related to said sector address information.

According to this aspect, since sector address information or mutual relation information is outputted together with the main information composing of the information sector, even when the recording is started from the middle part of the main information, it is possible to record the main information so as to be reproduced in accordance with the original composition order thereof.

The above object of the present invention can be achieved by information outputting method of the present invention. The method is provided with: an outputting process for outputting main information composed of a plurality of partial information to an information recording apparatus together with order information, which shows a configuration order in said main information of said respective partial information, along a reproduction time series in said main information; and a controlling process for controlling said outputting process so as to repeatedly perform said outputting process with respect to the same said main information and said order information.

According to the present invention, since order information is outputted together with main information, even when the recording is started from the middle part of the foregoing main information to be outputted upon recording the foregoing outputted main information, it is possible to record the main information so as to be reproduced in accordance with the original composition order thereof.

In one aspect of the present invention, said information recording apparatus records said outputted main information in a recording medium by using said outputted order information so that said main information is reproduced on the basis of said order information.

According to this aspect, even when the recording is started from the middle part of the foregoing main information to be outputted upon recording the foregoing outputted main information in the recording medium by using the order information, it is possible to record the main information so as to be reproduced in accordance with the original composition order thereof.

In another aspect of the present invention, said main information is compressed having no relation to a time axis.

According to this aspect, it is possible to output a large amount of main information to the information recording apparatus in a short period of time.

In another aspect of the present invention, said outputting process further comprises a distributing process for distributing said main information and said order information to said information recording apparatus through the telecommunication lines.

According to this aspect, since the main information and the order information are distributed through the electric communication lines, even when the information outputting apparatus and the information recording apparatus are placed apart, it is possible to rapidly output the main information and the order information and to transmit them.

In another aspect of the present invention, said main information includes regulating information for regulating the number of times for copying after said main information is recorded in said recording medium; said outputting process further comprises a changing process for uniformly changing said respective order information in association with a content of the foregoing included regulating information and generating changing order information; and said changing order information is outputted to said information recording apparatus together with said main information in said outputting process.

According to this aspect, by confirming the state of the combination of the foregoing regulating information and the changing order information upon reproducing the main information, which is recorded in the recording medium by the information recording apparatus, it is possible to prevent the main information, which is illegally copied, from being illegally reproduced.

In another aspect of the present invention, said partial information comprises an information sector, and said order information is any one of sector address information in association with said respective information sectors and relative information which is related to said sector address information.

According to this aspect, since sector address information or mutual relation information is outputted together with the main information composing of the information sector, even when the recording is started from the middle part of the main information, it is possible to record the main information so as to be reproduced in accordance with the original composition order thereof.

The above object of the present invention can be achieved by information outputting method of the present invention for recording main information and order information, which are outputted by information outputting method. The information outputting method is provided with: an outputting process for outputting said main information composed of a plurality of partial information to an information recording apparatus together with said order information, which shows a configuration order in said main information of said respective partial information, along a reproduction time series in said main information; and a controlling process for controlling said outputting process so as to repeatedly perform said outputting process with respect to the same said main information and said order information. The recording method is provided with the processes of: obtaining said outputted main information and said outputted order information; and recording said obtained main information in said recording medium by using said obtained order information in the order of obtaining.

According to the present invention, the obtained main information is recorded in the recording medium in the order of obtaining by using the order information, so that it is possible to record the main information so as to be reproduced in accordance with the original composition order thereof, even when the foregoing main information is recorded In the recording medium from the middle part of the main information during being outputted.

In one aspect of the present invention, address information showing a recording position on said recording medium is recorded in advance on said recording medium, and said partial information in association with said order information is recorded on a recording position on said recording medium, which is indicated by said address information associated with said obtained order information, in said recording process.

According to this aspect, the main information in association with the foregoing order information is recorded in the recording position, which is represented by the address information in association with the order information, so that it is possible to record the main information so as to be reproduced by a simple processing in accordance with the original composition order thereof.

In another aspect of the present invention, said partial information comprises an information sector, and said order information is any one of sector address information in association with said respective information sectors and relative information which is related to said sector address information.

According to this aspect, since sector address information or mutual relation information is outputted together with the main information composing of the information sector, even when the recording is started from the middle part of the main information. It is possible to record the main information so as to be reproduced in accordance with the original composition order thereof.

The above object of the present invention can be achieved by an information recording medium of the present invention, in which an information outputting controlling program recorded so as to be read by a computer included in an information outputting apparatus. The program makes the computer function as: an outputting device for outputting main information composed of a plurality of partial information to an information recording apparatus together with order information, which shows a configuration order in said main information of said respective partial information, along a reproduction time series in said main information; and a controlling device for controlling said outputting device so as to repeatedly perform said outputting operation with respect to the same said main information and said order information.

According to the present invention, since a computer functions so that the order information is outputted together with the main Information, even when the recording is started from the middle part of the foregoing main information to be outputted upon recording the foregoing outputted main information, it is possible to record the main information so as to be reproduced in accordance with the original composition order thereof.

In one aspect of the present invention, said information recording apparatus records said outputted main information in a recording medium by using said outputted order information so that said main information is reproduced on the basis of said order information.

According to this aspect, even when the recording is started from the middle part of the foregoing main information to be outputted upon recording the foregoing outputted main information in the recording medium by using the order information, it is possible to record the main information so as to be reproduced in accordance with the original composition order thereof.

In another aspect of the present invention, said main information is compressed having no relation to a time axis.

According to this aspect, it is possible to output a large amount of main information to the information recording apparatus in a short period of time.

In another aspect of the present invention, said program makes the computer further function as a distributing device for distributing said main information and said order information to said information recording apparatus through the telecommunication lines.

According to this aspect, since a computer functions so that the main information and the order information are distributed through the electric communication lines, even when the information outputting apparatus and the information recording apparatus are placed apart, it is possible to rapidly output the main information and the order information and to transmit them.

In another aspect of the present invention, said main information includes regulating information for regulating the number of times for copying after said main information is recorded in said recording medium, and said program makes said computer further function as: a changing device for uniformly changing said respective order information in association with a content of the foregoing included regulating information and for outputting said changing order information to said information recording apparatus together with said main information.

According to this aspect, by confirming the state of the combination of the foregoing regulating information and the changing order information upon reproducing the main information, which is recorded in the recording medium by the information recording apparatus, it is possible to prevent the main information, which is illegally copied, from being illegally reproduced.

In another aspect of the present invention, said partial information comprises an information sector, and said order information is any one of sector address information in association with said respective information sectors and relative information which is related to said sector address information.

According to this aspect, since sector address information or mutual relation information is outputted together with the main information composing of the information sector, even when the recording is started from the middle part of the main information, it is possible to record the main information so as to be reproduced in accordance with the original composition order thereof.

The above object of the present invention can be achieved by an information recording medium of the present invention in which an information recording controlling program is recorded so as to be read by a computer included in a recording controlling apparatus, wherein said recording controlling apparatus records main information and order information, which are outputted from an information outputting apparatus, in a recording medium, wherein the information outputting apparatus comprises: an outputting device for outputting said main information composed of a plurality of partial information to said information recording apparatus together with said order information, which shows configuration order of said respective partial information in said main information, along a reproduction time series in said main information; and a controlling device for controlling the outputting device so as to repeatedly perform said outputting operation with respect to the same said main information and said order information, wherein said program makes the computer function as: an obtaining device for obtaining said outputted main information and said outputted order information; and a recording device for recording said obtained main information in said recording medium by using said obtained order information in the order of obtaining.

According to the present invention, a computer functions so that the obtained main information is recorded in the recording medium in the order of obtaining by using the order information, so that it is possible to record the main information so as to be reproduced in accordance with the original composition order thereof even when the foregoing main information is recorded in the recording medium from the middle part of the main information during being outputted.

In one aspect of the present invention, an address information showing a recording position on said recording medium is recorded in advance on said recording medium, and said recording device records said partial information in association with said order information on a recording position on said recording medium, which is indicated by said address information associated with said obtained order information.

According to this aspect, a computer functions so that the main information in association with the foregoing order information is recorded in the recording position, which is represented by the address information in association with the order information, so that it is possible to record the main information so as to be reproduced by a simple processing in accordance with the original composition order thereof.

In another aspect of the present invention, said partial information comprises an information sector, and said order information is any one of sector address information in association with said respective information sectors and relative information which is related to said sector address information.

According to this aspect, since sector address information or mutual relation information is outputted together with the main information composing of the information sector, even when the recording is started from the middle part of the main information, it is possible to record the main information so as to be reproduced in accordance with the original composition order thereof.

The above object of the present invention can be achieved by an information outputting recording system of the present invention. The system is provided with: (a) an information outputting apparatus comprising: an outputting device for outputting main information composed of a plurality of partial information to an information recording apparatus together with order information, which shows a configuration order in said main information of said respective partial information, along a reproduction time series in said main information; and a controlling device for controlling the outputting device so as to repeatedly perform said outputting operation with respect to the same said main information and said order information; and (b) said information recording apparatus comprising: an obtaining device for obtaining said outputted main information and said outputted order information; and a recording device for recording said obtained main information in said recording medium in the order of obtaining by using said obtained order information.

According to the present invention, since the order information is outputted together with the main information and the foregoing outputted main information is recorded by using the order information, even when the recording is started from the middle part of the foregoing main information to be outputted, it is possible to record the main information so as to be reproduced in accordance with the original composition order thereof.

The above object of the present invention can be achieved by a computer data signal embodied in a carrier wave and representing a series of instructions which cause a computer to perform steps to execute an outputting controlling process in an information outputting apparatus. The steps includes: an outputting step for outputting main information composed of a plurality of partial information to an information recording apparatus together with order information, which shows a configuration order in said main information of said respective partial information, along a reproduction time series in said main information; and a controlling step for controlling said outputting device so as to repeatedly perform said outputting operation with respect to the same said main information and said order information.

According to the present invention, since a computer functions so that the order information is outputted together with the main information, even when the recording is started from the middle part of the foregoing main information to be outputted upon recording the foregoing outputted main information, it is possible to record the main information so as to be reproduced in accordance with the original composition order thereon.

The above object of the present invention can be achieved by a computer data signal embodied in a carrier wave and representing a series of instructions which cause a computer to perform steps to execute a recording controlling process in a recording controlling apparatus, wherein said recording controlling apparatus records main information and order information, which are outputted from an information outputting apparatus, in a recording medium, wherein the information outputting apparatus comprises: an outputting device for outputting said main information composed of a plurality of partial information to said information recording apparatus together with said order information, which shows configuration order of said respective partial information in said main information, along a reproduction time series in said main information; and a controlling device for controlling the outputting device so as to repeatedly perform said outputting operation with respect to the same said main information and said order information, the steps comprising: an obtaining step for obtaining said outputted main information and said outputted order information; and a recording step for recording said obtained main information in said recording medium by using said obtained order information in the order of obtaining.

According to the present invention, a computer functions so that the obtained main information is recorded in the recording medium in the order of obtaining by using the order information, so that it is possible to record the main information so as to be reproduced in accordance with the original composition order thereof even when the foregoing main information is recorded in the recording medium from the middle part of the main information during being outputted.

BRIEF DESCRIPTION OF THE DRAWINGS

FIG. 15 is a flow chart for showing a recording processing of a third embodiment of the present invention.

DESCRIPTION OF THE PREFERRED EMBODIMENTS

Then, the preferred embodiments of the present invention will be described with reference to the drawings. In respective embodiments to be described below, the present invention is applied in a contents distributing system including an outputting apparatus for reproducing contents from a DVD (an optical disk having a recording capacity several times as much as that of a conventional CD (Compact Disc)), in which the contents are recorded, and distributing the reproduced contents through the Internet lines and a recording apparatus for recording the foregoing distributed contents in a DVD-R (DVD-Recordable) that is a recordable DVD.

(1) First Embodiment

At first, a first embodiment of the present invention will be explained with reference to FIGS. 1 to 11.

Figure 1:
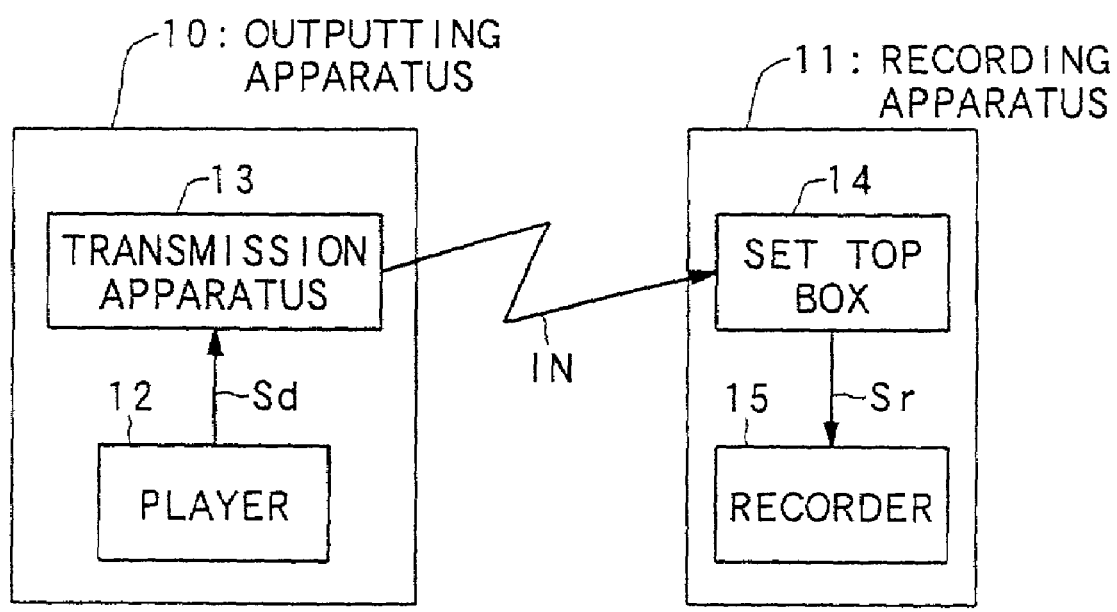
FIG. 1 is a block diagram for showing a whole configuration of a content distributing system.

At the beginning, a whole configuration and a whole operation of a contents distributing system according to the first embodiment will be described with reference to FIG. 1. FIG. 1 is a block diagram for showing a whole configuration of the content distributing system.

As shown in FIG. 1, a contents distributing system S according to the first embodiment is composed of: an outputting apparatus 10 for outputting (distributing) contents (including reproducing control information for controlling a reproduction manner (a reproduction order, a reproduction speed or the like) of the foregoing contents) through the Internet lines IN; and a recording apparatus 11 for obtaining the foregoing outputted contents from the Internet lines IN and recording it in the DVD-R.

Alternatively, the outputting apparatus 10 is composed of: a player 12 for reproducing the foregoing contents from the DVD, in which the contents are recorded, and outputting it as a reproduction signal Sd; and a transmission apparatus 13 as a distributing device for applying a predetermined modulation processing or the like to the foregoing reproduction signal Sd and outputting it to the Internet lines IN.

Further, the recording apparatus 11 is composed of: a set top box 14 as a receiving obtaining device for obtaining the foregoing outputted contents from the Internet IN and outputting it as a recording signal Sr; and a recorder 15 as a recording device for recording the foregoing outputted recording signal Sr in the DVD-R by a method to be described later.

(A) Configuration and Operation of Player

Next, the detailed configuration and the operation of the player 12 according to the first embodiment will be explained with reference to FIGS. 2 to 5.

Figure 2:
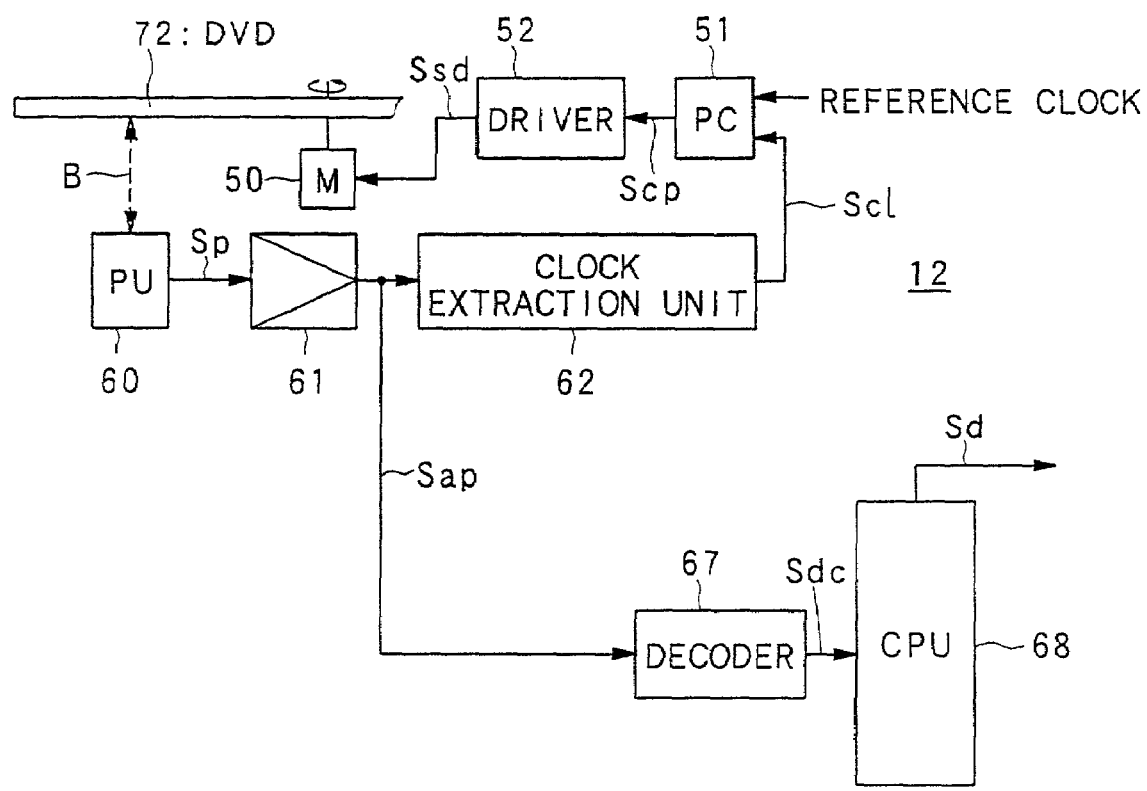
FIG. 2 is a block diagram for showing a detailed configuration of a player.
Figure 3:
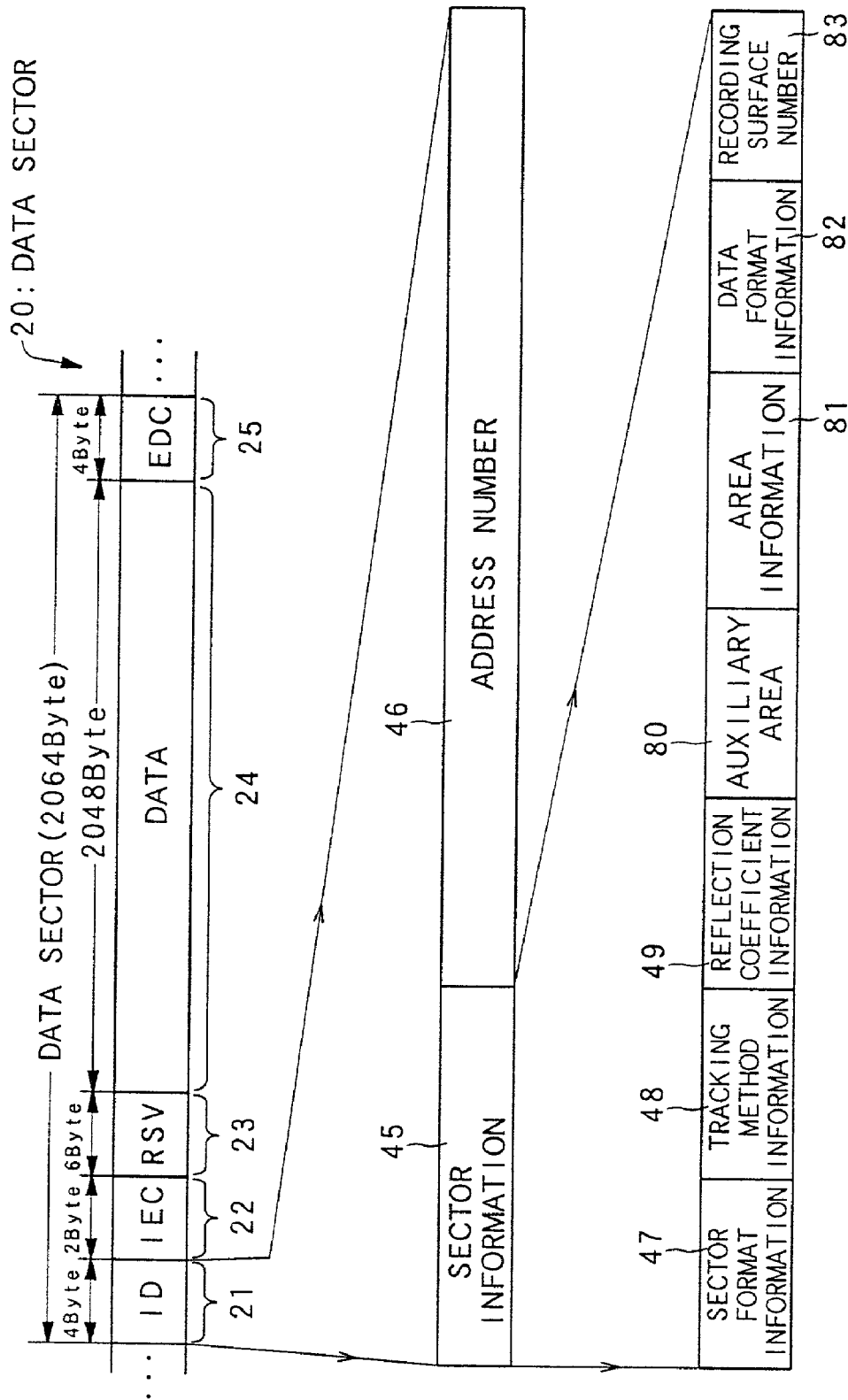
FIG. 3 is a diagram (I) for explaining a format of the content in a reproduction signal.
Figure 4:
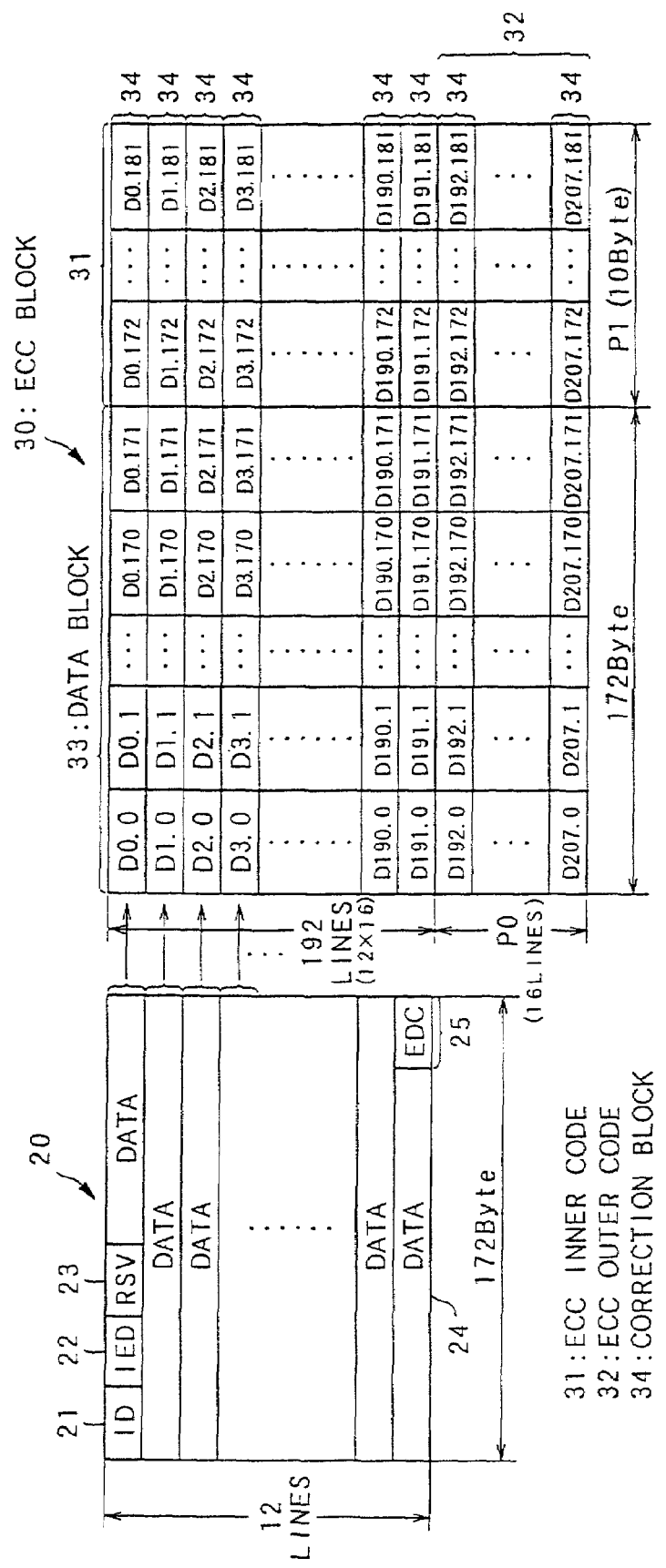
FIG. 4 is a diagram (II) for explaining a format of the content in a reproduction signal.
Figure 5:
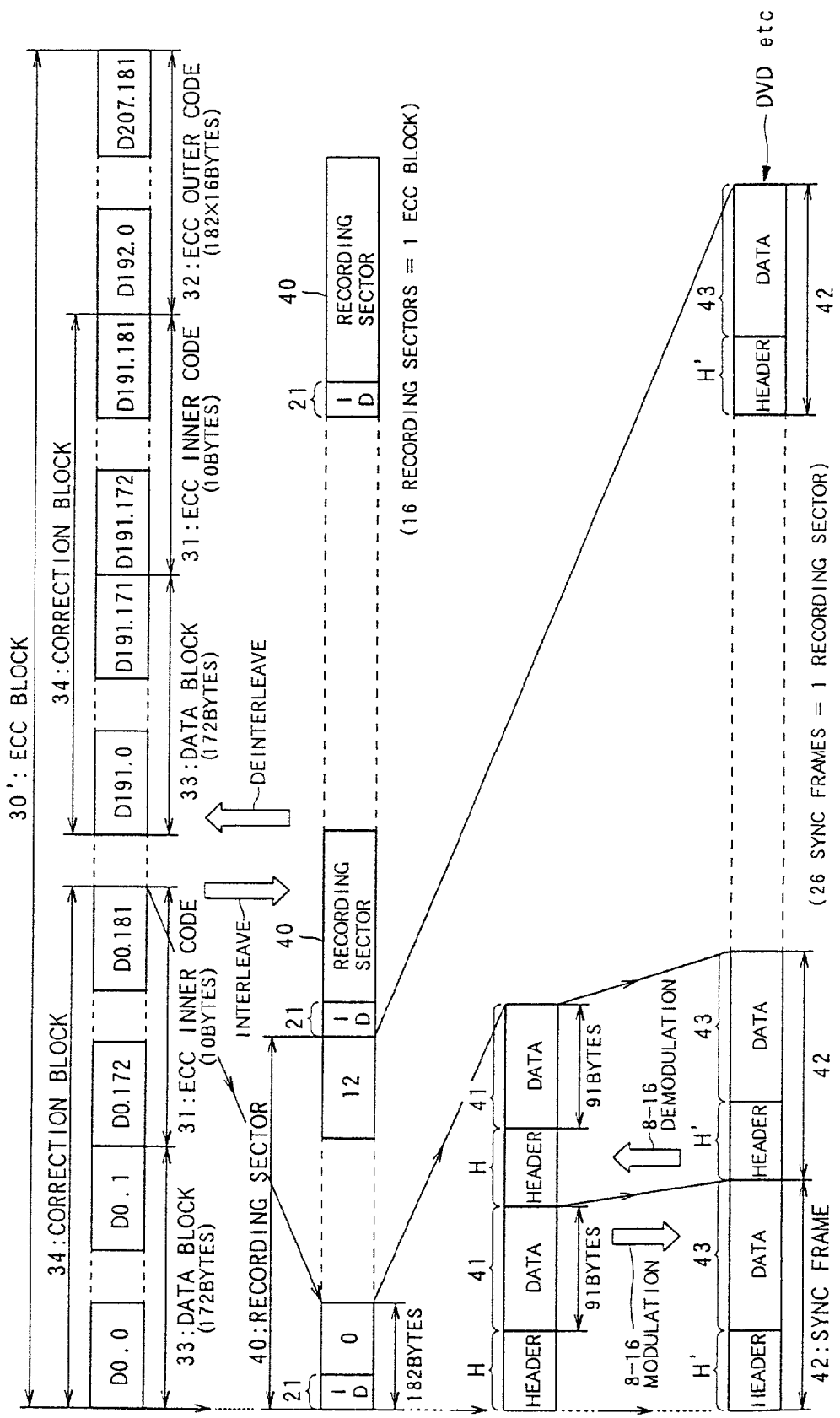
FIG. 5 is a diagram (III) for explaining a format of the content in a reproduction signal.

FIG. 2 is a block diagram for showing a detailed configuration of the player 12. Additionally, FIGS. 3 to 5 are diagrams for explaining a format of the contents, which are included in the reproduction signal Sd.

As shown in FIG. 2, the player 12 of the first embodiment is composed of: a spindle motor 50 for rotating a DVD 72, in which the contents are recorded, with a preset number of revolutions; a driver 52; a phase comparator 51; a pick up 60; an RF (Radio Frequency) amplifier 61; a clock extraction unit 62; a decoder 67; and a CPU 68 as an outputting device and a changing device.

Here, the foregoing contents are compressed by a compression system such as a so-called MPEG (Moving Picture Experts Group) system or the like without relation to a time axis, in other words, by a so-called variable bit rate.

Then, the operation of the player 12 will be explained below.

At first, the pick up 60 irradiates an optical beam B for reproducing the information having a preset and fixed intensity on the information recording surface of the DVD 72. Then, the pick up 60 generates an RF signal Sp in association with the contents, which are recorded in the foregoing DVD 72, on the basis of its reflection to output it to the RF amplifier 61.

Thus, the RF amplifier 61 applies a waveform forming processing, an amplifying processing and the like to the foregoing RF signal Sp, generates an amplified signal Sap and outputs it to the clock extraction unit 62 and the decoder 67.

Then, the clock extraction unit 62 extracts a synchronization signal Scl used for controlling the rotation of the spindle motor 50 from the foregoing amplified signal Sap and outputs it to the phase comparator 51.

The phase comparator 51 compares the foregoing synchronization signal Scl with a preset reference clock, which is a reference of the foregoing rotation control, generates a phase difference signal Scp indicating a phase difference thereof and outputs it to the driver 52.

After that, the driver 52 generates a driven signal Ssd for rotating the spindle motor 50 on the basis of the phase difference signal Scp so that the phase difference shown by the foregoing difference signal Scp becomes zero. Then, the driver 52 outputs the generated driven signal Ssd to the foregoing spindle motor 50.

Thus, the spindle motor 50 rotates on the basis of the foregoing driven signal Ssd, so that the DVD 72 rotates with the above preset number of revolutions.

On the other hand, the decoder 67, in which the above described amplified signal Sap is inputted, applies a preset demodulation processing or the like to the foregoing amplified signal Sap, generates the demodulation signal Sdc in association with the contents recorded in the above described DVD 72, and outputs it to the CPU 68.

The CPU 68 repeatedly outputs the foregoing demodulation signal Sdc as the above described reproduction signal Sd to the transmission apparatus 13 and to the Internet IN with respect to the same contents. Simultaneously, the CPU 68 overall controls the operations of the above described respective component members so that they repeat the above described operations as the player 12.

Then, a format of the reproduced contents, which are included in the above described reproduction signal Sd, will be explained with reference to FIGS. 3 to 5.

The above described contents recorded in the DVD 72 are physically composed so as to include a plurality of data sectors 20 illustrated in the top part of FIG. 3.

One of the data sectors 20 includes from the head point thereof: ID information 21 including a sector address number showing a reproduction position (a reproduction order) in the foregoing contents of the data sector 20; an ID information error correction code (IEC (ID Data Error correction Code)) 22 for correcting an error of the forgoing ID information 21; an auxiliary data 23; data 24 comprising a picture, a sound itself or the like included in the above contents; and an error detecting code (EDC) 25 for detecting an error in the data 24. Further, a plurality of the data sectors 20 are continuously disposed, so that the above contents are composed.

Then, as shown in the middle part of FIG. 3, in detail, the foregoing ID information 21 is composed of: sector information 45 as several information with regard to the data sector 20, in which the ID information 21 is included; and an address number 46 of the above described sector.

Additionally, as shown in the lowest part of FIG. 3, the sector information 45 is composed of: sector format information 47 as the information representing a recording format in the DVD 72 (namely, the information representing whether or not the format is a so-called CLV (Constant Line Velocity) format, or the like); tracking method information 48 as the information representing a tracking system in the DVD 72 (namely, the information representing whether or not the system is a so-called group tracking system, or the like); reflection coefficient information 49 as the information indicating a design value of the reflection coefficient of an optical beam B in the DVD 72; an auxiliary area 80 in which no information is included; area information 81 as the information indicating a segment of the area on the DVD 72 in which the data sector 20 thereof is recorded (namely, a segment to indicate whether the data sector 20 thereof is recorded in the recording area on the DVD 72 or it is recorded in the lead-in-area or the like); data format information 82 as the information representing a format of the data 24 included in the data sector 20 (namely, a format to indicate whether the foregoing data 24 comprises a picture or a sound itself or it comprises the information in the connection area in a rewritable optical disk); and a recording surface number 83 for indicating the number of the information recording surface in which the data sector 20 is recorded (namely, the information recording surface number of the DVD having not less than two information recording surfaces).

Next, a configuration of an ECC (Error Correcting Code) block, which is composed of a plurality of the above described data sectors 20 on the DVD 72, will be explained with reference to FIG. 4.

Here, the foregoing ECC block is a collection of the data which is a base unit of the error correction processing to be carried out in the decoder 67 upon reproducing the contents from the DVD 72.

In the ECC block composed of a plurality of data sectors 20, a plurality of data blocks 33 and a plurality of ECC inner codes (PI (Parity In) codes ) 31 are included. The data block 33 is an each data block which is obtained by dividing one data sector 20 for every 172 bytes. Each ECC inner code 31 having 10 bytes length is added to the end of each data block 33 in a data assembly which is composed by aligning twelve lines of data blocks 33 in the vertical direction (see a left portion in FIG. 4). The ECC block includes a plurality of correction blocks 34, each of which is obtained by adding each ECC inner code 31 to each data block 33.

In this case, twelve correction blocks 34, i.e., twelve lines of the correction blocks 34 are equivalent to one data sector 20. One ECC block 30 includes these correction blocks 34, which are equivalent to sixteen data sectors 20, i.e., 192 lines of the correction blocks 34.

Further, in the ECC block 30, the above 192 lines of the correction blocks 34 are divided in the vertical direction for every byte from the beginning with being aligned in the vertical direction and sixteen ECC outer codes (PO (Parity Out) code) 32 are added to the divided data, respectively. The foregoing ECC outer code 32 is a so added to a portion of the ECC inner code 31 in the above described correction block 34.

According to the above described configuration, one ECC block 30 including sixteen data sectors 20 is formed as shown in a right portion of FIG. 4. In this case, a total amount of the information included in one ECC block 30 is represented by the following mathematical expression:

$$(172+10) \text{ bytes} \times (192+16) \text{ lines} = 37{,}856 \text{ bytes.} \quad \text{(Expression 1)}$$

In the above expression 1, an actual data 24 is represented by the following mathematical expression:

$$2{,}048 \text{ bytes} \times 16 = 32{,}768 \text{ bytes.} \quad \text{(Expression 2)}$$

Additionally, in the ECC block 30 shown in FIG. 4, data of one byte is represented by "D#.*". For example, "D1.0" represents the one byte data disposed in the first line and the zero column and "D190.170" represents the one byte data disposed in the 190th line and the 170th column. Accordingly, the ECC inner codes 31 are disposed on from the 172nd to the 181st lines and the ECC outer codes 32 are disposed on from the 192nd to the 207th lines.

Further, one correction block 34 is continuously recorded on the DVD 72.

The ECC block 30 is configured with including both of the ECC inner code 31 and the ECC outer code 32 as shown in a right portion of FIG. 4 so as to correct the data aligned in the horizontal direction in the right portion of FIG. 4 by the ECC inner code 31 and to correct the data aligned in the vertical direction in the right portion of FIG. 4 by the ECC outer code 32. In other words, it becomes possible to correct the error doubly in the horizontal direction and the vertical direction in the ECC block 30, which is shown in the right portion of FIG. 4.

The above point is specifically described below. For example, even if one correction block 34 (as described above, it includes one line of the ECC inner code 31, i.e., the data, of which total amount is 182 bytes, and it is continuously recorded on the DVD 72) is completely destroyed by a scratch or the like of the DVD 72, the data is destroyed only be one byte with respect to one column of the EGC outer code 32 in the vertical direction. Accordingly, if the error is corrected in the decoder 67 on the reproduction by using the ECC outer code 32 in each column, it is possible to accurately correct the error and reproduce the contents even when one correction block 34 is completely destroyed.

Then, the actual recording format in the above described EIC block 30 on the DVD 72 will be explained with reference to FIG. 5.

Alternatively, in FIG. 5, the data represented by "D#.*" corresponds to each data described in the right portion of FIG. 4.

As shown in the top part of FIG. 5, the ECC block 30 on the DVD 72 is divided in sixteen recording sectors 40, which are obtained by aligning the ECC block 30 in the horizontal direction in a row for every correction block 34 and interleaving it, to be recorded.

In this case, one recording sector 40 includes the information of 2,366 bytes (i.e., 37,856 bytes÷16). The data sector 20 and the ECC inner code 31 or the ECC outer code 32 are mixed in this one recording sector 40. However, an ID information 21 in the data sector 20 (see FIG. 3) is disposed on a head of respective recording sectors 40.

Then, one recording sector 40 is divided into data 41 each having 91 bytes length and added to a header H, respectively. In this state, the contents are recorded in the DVD 72 as one sync frame 42 obtained by so-called 8-16 modulating the recording sector 40 for each data 41.

In this case, one sync frame 42 is composed of a header H' and data 43. Alternatively, the amount of the information in one sync frame 42 is represented by the following mathematical expression:

$$91 \text{ bytes} \times 8 \times (16/8) = 1{,}456 \text{ bytes.} \quad \text{(Expression 3)}$$

The contents are recorded in the DVD 72 with these sync frames 42 being continuously disposed. In this case, one recording sector 40 includes twenty-six sync frames 42.

Since the contents are recorded in the DVD 72 in the recording format, which is configured as described above, if 8-16 demodulation and deinterleaving are performed upon reproducing the foregoing contents (see FIG. 5), the original ECC block 30 is capable of being restored and it becomes possible to accurately reproduce the contents due to the above described strong error correction and output it to the transmission apparatus 13 as the reproduction signal Sd.

Alternatively, the above described reproduction signal Sd to be outputted to the Internet IN through the transmission apparatus 13 is outputted on the foregoing Internet IN with the recording sectors 40 being aligned having the ID information 21, which is shown a second part from the top in FIG. 5 as a head.

(B) Configuration and Operation of Recorder

Next, the detailed configuration and the operation of the recorder 15 according to the first embodiment will be explained with reference to FIGS. 6 to 11.

Figure 6:
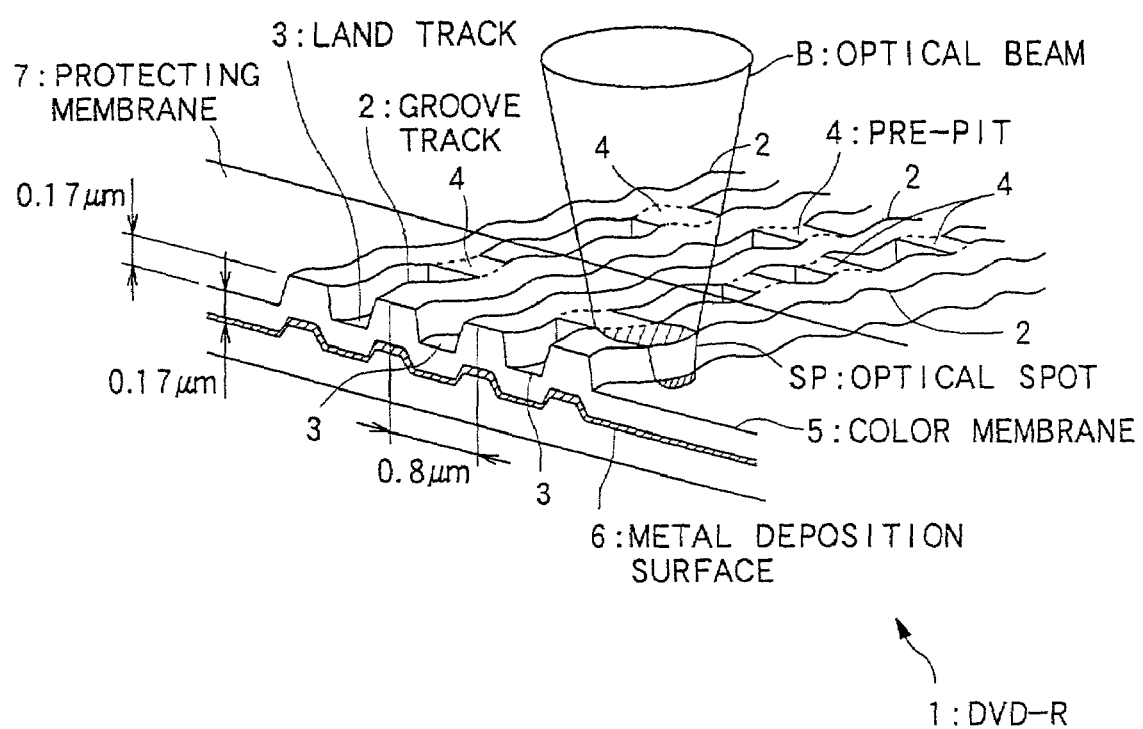
FIG. 6 is a cross-sectional perspective views for showing a configuration of a DVD-R.
Figure 7:
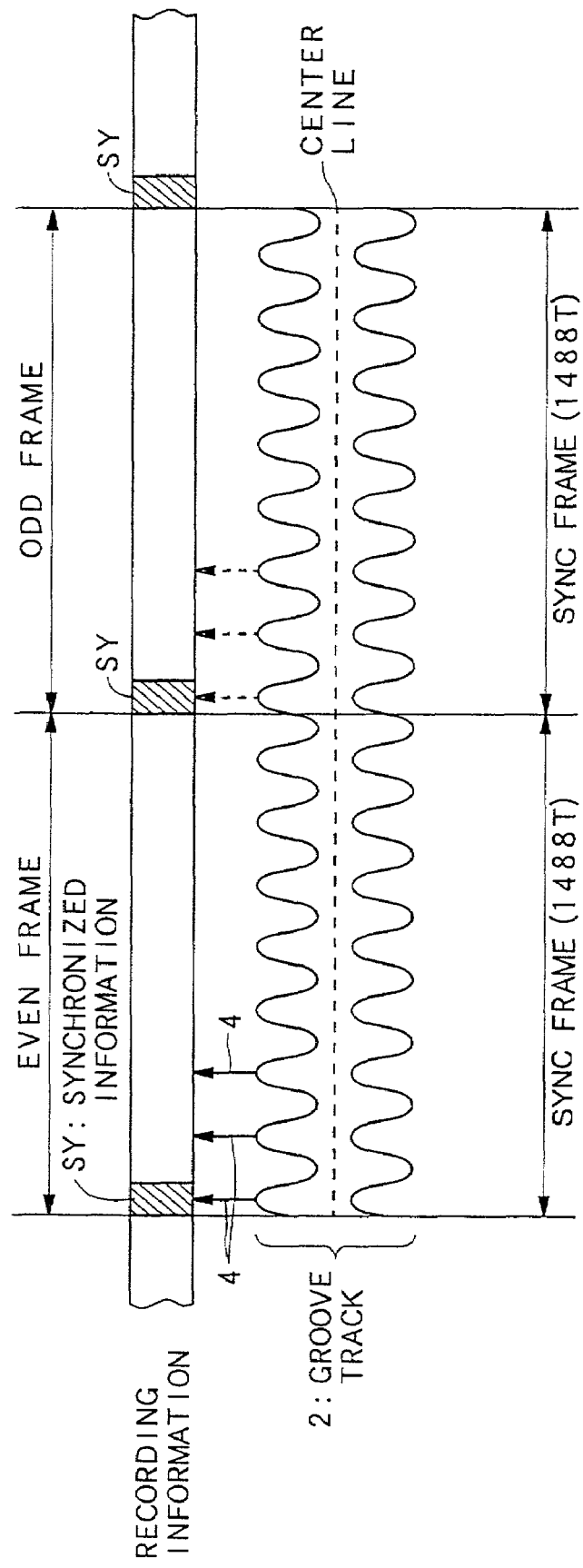
FIG. 7 is a diagram for showing a recording format in the DVD-R.
Figure 8:
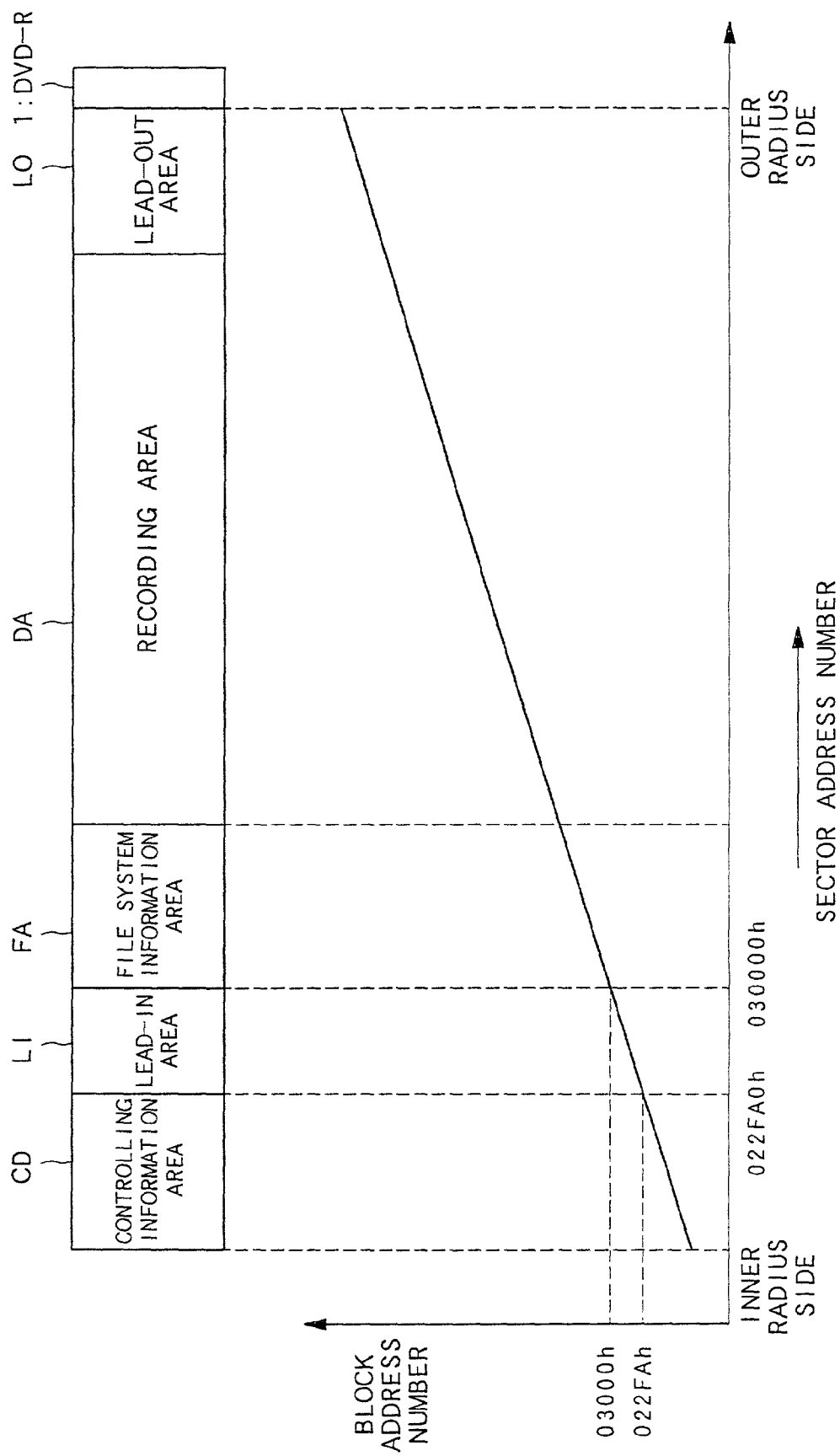
FIG. 8 is a diagram for showing a block address number or the like in the DVD-R.
Figure 9:
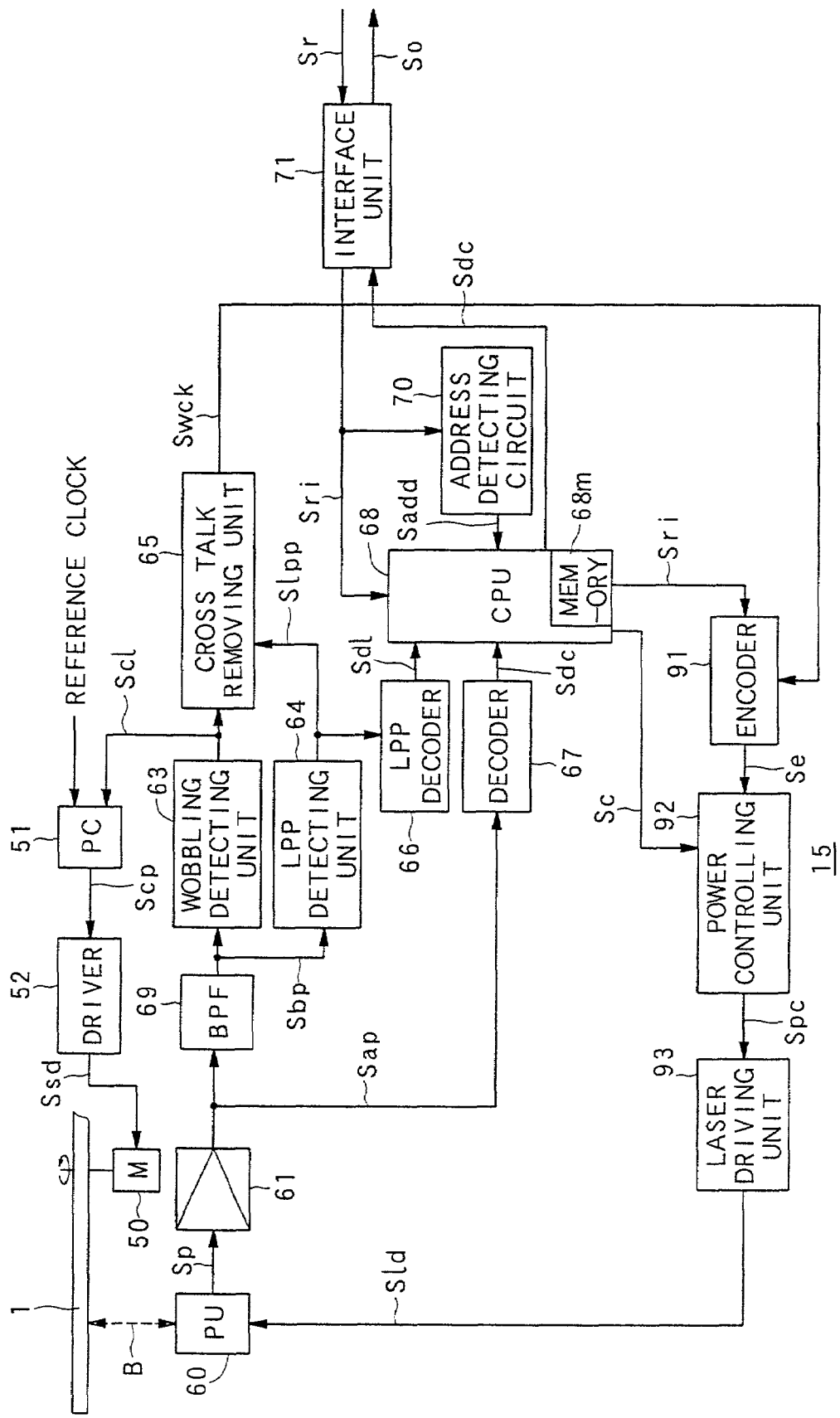
FIG. 9 is a block diagram for showing a detailed configuration of a recorder.
Figure 10:
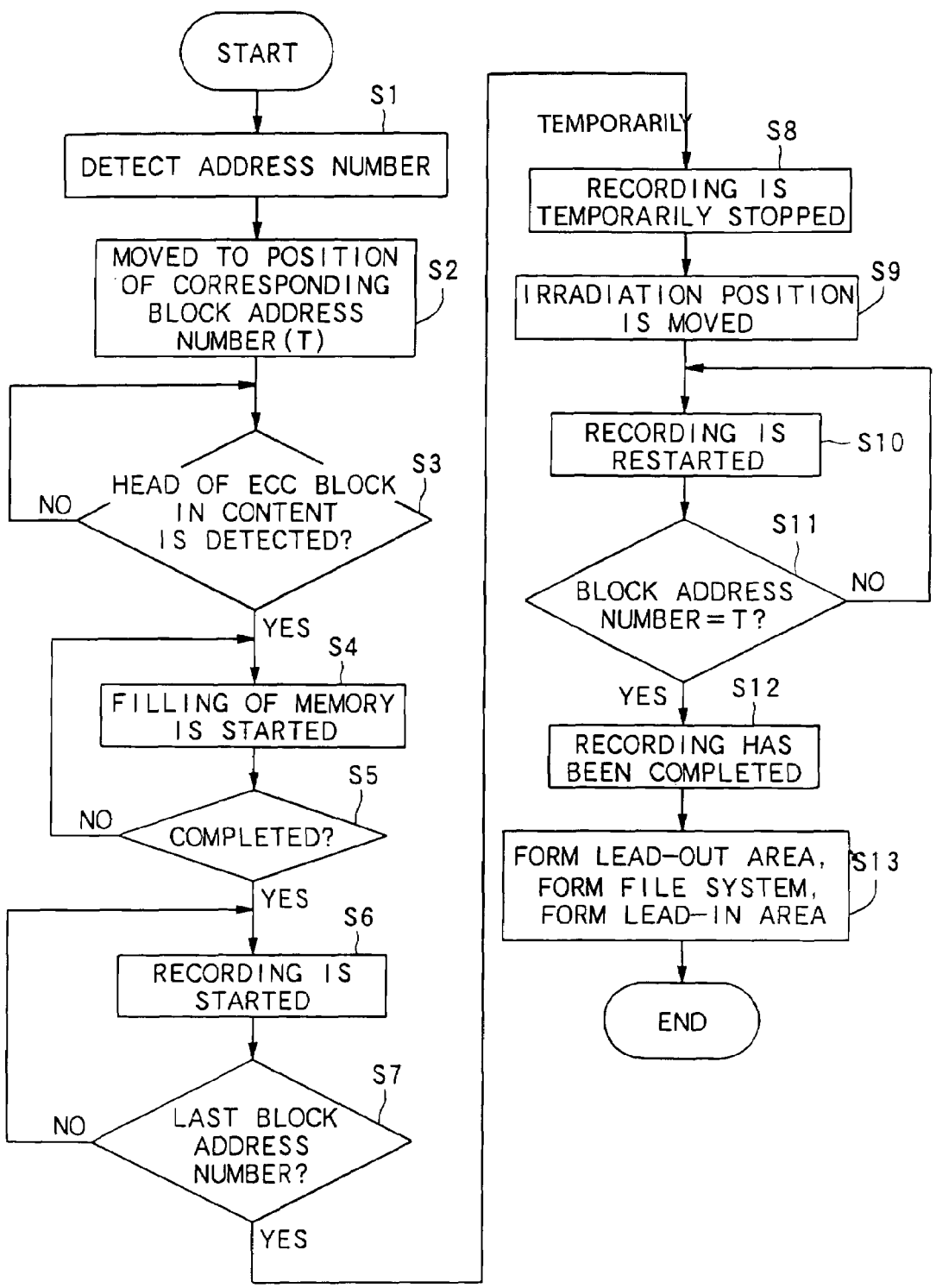
FIG. 10 is a flow chart for showing a recording processing of a first embodiment of the present invention.
Figure 11:
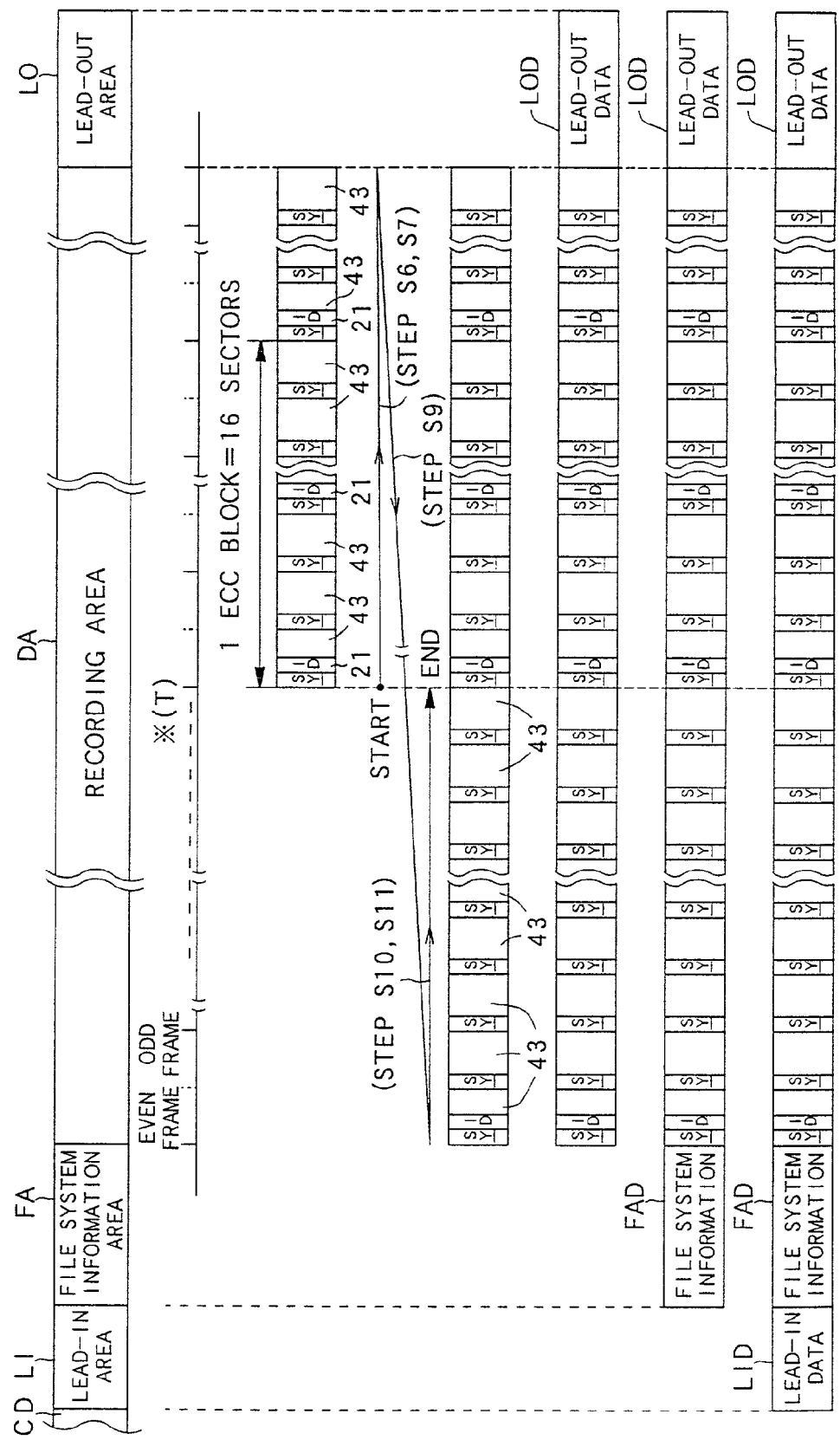
FIG. 11 is a diagram for showing a recording manner of the first embodiment.

FIGS. 6 to 8 show the configuration of the DVD-R in which the contents are recorded by the recorder 15. FIG. 9 is a block diagram showing the detailed configuration of the recorder 15. FIGS. 10 and 11 are flow chart or the like showing the recording processing in the recorder 15.

At first, prior to explaining the operation of the recorder 15, the configuration and the recording manner of the DVD-R in which the contents to be outputted through the above described Internet IN are recorded, will be explained with reference to FIGS. 6 to 8.

At first, with reference to FIG. 6, the structure of the DVD-R according to the first embodiment will: be explained.

In FIG. 6, a DVD-R 1 rotated in a linear velocity fixed system comprises a coloring DVD-R which comprises a color membrane 5 and which is capable of writing the information once. In this DVD-R 1, a groove track 2 which is a track to be recorded with the contents, and a land track 3 for guiding the optical beam B such as a laser beam or the like as the reproduced light or the recorded light to the foregoing groove track 2 are formed.

Additionally, this DVD-R comprises: a protecting membrane 7 for protecting the above groove track 2 and the land track 3; and a metal deposition surface 6 for reflecting the optical beam B upon reproducing the recorded information. A pre-pit 4 in association with pre-information is formed in this land track 3. In this case, the foregoing pre-pit 4 is formed in advance prior to shipping the DVD-R 1.

Here, as the above described pre-information, an address number showing a position on the DVD-R 1 to be recorded with the contents (hereinafter, the address number recorded on the DVD-R 1 by using the pre-pit 4 is referred to as a block address number) is recorded by using the above described pre-pit 4.

Further, in the foregoing DVD-R 1, the groove track 2 is wobbled with a frequency in association with the rotation rare of the foregoing DVD-R 1. A synchronized signal for controlling the rotation by a wobbling of this groove track 2 is recorded in advance prior to shipping the DVD-R 1 as same as the above described pre-pit 4.

Then, upon recording the above described contents in the DVD-R 1, detecting a frequency of the wobbling of the groove track 2 by the recorder 15 allows the above described synchronized signal to be obtained so as to control the rotation of the DVD-R 1 with a predetermined rotation rate and detecting the pre-pit 4 allows a pre-information to be obtained in advance. The optimum output or the like of the optical B as a recording light is set on the basis of the obtained pre-information and a block address number or the like representing a position on the DVD-R 1 to be recorded with the contents is obtained. Then, the foregoing contents are recorded on a recording position in association with the above described ID information 21 to be outputted on the basis of this block address number.

Upon recording the contents, the optical beam B is irradiated so that a center of the optical beam B accords with a center of the groove track 2. Then, recording pits in association with the recording information are formed on the groove track 2 to record the foregoing contents.

In this case, a size of an optical spot SP is set so that a portion of the optical spot SP is irradiated not only on the groove track 2 but also on the land track 3 as shown in FIG. 6. After that, by using a portion of the reflection lights of the optical soot SP irradiated on this land track 3, the above described pre-information is detected from the pre-pit 4 by a push-pull method (a radial push-pull method by using an optical detector divided by a dividing line, which is in parallel with a rotation direction of the DVD-R 1) to obtain the foregoing pre-information. Further, by using a portion of the reflection light of the optical spot SP irradiated on the groove track 2, a wobbling signal is detected from the groove track 2 and the synchronized signal or the like for controlling the rotation is obtained.

In the next place, pre-information recorded in the DVD-R 1 according to the first embodiment in advance, rotation controlling information and a recording format of the above described recording information will be explained with reference to FIG. 7.

In FIG. 7, an upper part represents the recording format of the recording information and a wave form in a lower part represents a wobbling state of the groove track 2, which records the foregoing recording information (namely, a plane view of the groove track 2). An upward arrow between the recording information and the wobbling state of the groove track 2 schematically represents a position in which the pre-pit 4 is formed.

In FIG. 7, the wobbling state of the groove track 2 is represented by larger amplitude than actual amplitude so as to be easily understood and the recording information is recorded on a central line of the foregoing groove track 2.

As shown in FIG. 7, the recording information to be recorded in the DVD-R 1 according to the first embodiment is divided in advance for every sync frame 42 as described above. Then, one recording sector 40 is formed as an information unit by twenty-six sync frames. Further, the above described ECC block 30 is formed by sixteen recording sectors 40.

Alternatively, one sync frame 42 has a 1488-fold (1488 T) length as long as a unit length in association with a bit spacing (hereinafter, referred to as T) which is defined by a recording format upon recording the above described recording information. Further, a synchronized information SY is recorded in a portion having a length of 14T in the head of one sync frame 42 as the above described header H' (see the lowest step of FIG. 5) to synchronize upon recording for every sync frame.

On the other hand, the pre-information recorded in the DVD-R 1 according to the first embodiment is recorded for every sync frame 42. In the case of recording the pre-information by the pre-pit 4, one pre-pit 4 is always formed on the land track 3 adjoining an area in respective sync frames 42 in the contents, in which the synchronized information SY is recorded, to indicate the synchronized signal in the pre-information (hereinafter, the synchronized signal in the foregoing pre-information is referred to as a sync code so as to be distinguished from the above described synchronized signal for controlling the rotation of the DVD-R 1). At the same time, two pre-pits 4 or one pre-pit 4 are formed on the land track 3 adjoining a first half portion in the foregoing sync frame 42 other than the foregoing synchronized information SY to indicate the contents of the recorded pre-information (i.e., a block address number). Alternatively, with respect to the first half portion in the foregoing sync frame other than the synchronized information SY, there is a case that the pre-pit 4 is not formed depending on the contents of the pre-information to be recorded. Additionally, at a head sync frame 42 in one recording sector 40 (an EVEN frame to be described later), three pre-pits 4 are always continuously formed in its first half portion.

Here, in the DVD-R 1 of the first embodiment, the pre-pit 4 is formed only in an even-numbered sync frame 42 (hereinafter, referred to as an EVEN frame) or only in an odd-numbered sync frame 42 (hereinafter, referred to as an ODD frame) in one recording sector 40, so that the pre-information is recorded. In other words, in the case that the pre-pit 4 is formed in the EVEN frame in FIG. 7 (it is indicated by a full line upward arrow in FIG. 7), the pre-pit 4 is not formed in the ODD frame adjoining the EVEN frame.

Additionally, considering a relation between the wobbling of the groove track 2 and the position of the pre-pit 4, the pre-pit 4 is formed in a position of the largest amplitude in the foregoing wobbling.

In order to specifically explain a relation between the contents of the pre-information and a position in which the pre-information is formed in the pre-pit 4, the pre-pit 4 formed on the land track 3 adjoining the area in which the synchronized information SY is recorded is defined as "a pre-pit B2" and the pre-pits 4 formed on the land track 3 adjoining the first half portion in the sync frame other than the synchronized information SY are defined as "a pre-pit B1" and "a pre-pit B0" from the head thereof. Then, as shown in the following table 1, the pre-pits B2 to B0 are completely formed in a place in association with a sync code in the EVEN frame in the head of one recording sector and the pre-pits B2 and B1 are only formed in a place in association with a sync code in the ODD frame. Further, the pre-pit B2 and the pre-pit B0 are only formed in a place in association with data "1" as the pre-information other than the sync code and the pre-pit B2 is only formed in a place in association with data "0" as the pre-information other than the sync code.

[Table 1]

TABLE 1

|  | Pre-pit | | |
| --- | --- | --- | --- |
| Contents of information | B2 | B1 | B0 |
| Sync code of EVEN frame | 1 | 1 | 1 |
| Sync code of ODD frame | 1 | 1 | 0 |
| Pre-information data "1" | 1 | 0 | 1 |
| Pre-information data "0" | 1 | 0 | 0 |

On the other hand, the groove track 2 is wobbled with a predetermined wobbling frequency of about 140 kHz (a frequency such that one sync frame 42 is equivalent to eight waves of the variation waveform of the groove track 2) across all sync frames 42. Alternatively, in the recorder 15, detecting the foregoing predetermined wobbling frequency allows the above described synchronized signal, which controls the rotation of the spindle motor 50 for rotating the DVD-R 1 to be described later, to be detected.

Then, the contents of the block address number recorded as the above described pre-information will be explained together with a whole configuration of the DVD-R 1 with reference to FIG. 8.

As shown in the upper part in FIG. 8, the DVD-R 1 is totally composed of, from its inner radius side: a controlling information area CD in which the information to be used as a controlling information upon recording the contents is recorded in advance; a lead-in area L1 in which start information or the like to be used upon starting the reproduction of the contents recorded in the DVD-R 1 is recorded; a file system Information area FA in which the information indicating a hierarchical structure of respective data included in the recorded contents is recorded; a recording area DA in which the content itself is Included in actual; and a lead-out area L0 in which termination information or the like to be used upon terminating the reproduction of the contents recorded in the DVD-R 1 is recorded.

In this case, the above described lead-in area L1, the file system information area FA and the lead-out area LO are formed in association with the foregoing contents after the contents have been recorded in the DVD-R 1.

Alternatively, as shown in the lower part in FIG. 8, a sector address number in the above described ID information 21 in the contents to be recorded in a head of the lead-in area L1 is defined as "022FA0h ("h" indicates a hexadecimal and so forth). Further, it is standardized that a sector address number in the above described ID information 21 in the contents to be recorded in a head of the file system information area FA is defined as "030000h" as shown in the lower part of FIG. 8.

On the other hand, the block address numbers recorded in advance as the above described pre-information by the pre-pit 4 are recorded so that they are recorded in ascending order from the innermost radius side of the controlling information area CD as the lowest value to the outer radius side of the DVD-R 1 as shown in a longitudinal axis of FIG. 8.

In this case, it is standardized that a relation between the block address number as the pre-information and the sector address number in the contents is defined so that the former should be 10h-fold as much as the latter.

In the next place, the detailed configuration and the operation of the recorder 15 in the recording apparatus 11 for recording the contents outputted from the above described outputting apparatus 10 to the above described DVD-R 1 through the Internet IN will be described with reference to FIGS. 9 to 11.

Alternatively, the recorder 15 of the first embodiment can not only record the contents in the DVD-R 1 but also reproduce them from the DVD-R 1.

Additionally, in the block diagram of FIG. 9, with respect to the same composing members as those of the block diagram shown in FIG. 2, the same reference numerals are given and the detailed explanation thereof is omitted.

As shown in FIG. 9, the recorder 15 of the first embodiment is composed of: a spindle motor 50 for rotating the DVD-R 1 in which the contents are recorded with a pre-set rotation number; a driver 52; a phase comparator 51; a pick up 60; an RF amplifier 61; a band pass filter 69; a wobbling detecting unit 63; an LPP (Land Pre Pit) detecting unit 64; an LPP decoder 66; a decoder 67; a CPU 68 including a memory 68m; an address detecting circuit 70; and an interface unit 71.

At first, the operation for reproducing the contents, which have been already recorded in the DVD-R 1, will be explained below.

In the above reproduction, the spindle motor 50, the driver 52, the phase comparator 51, the pick up 60, the RF amplifier 61, the decoder 67 and the CPU 68 generates the demodulation signal Sdc in association with the contents recorded In the rotating DVD-R 1 by performing the same operation as that of the above described player 12 to output the generated demodulation signal Sdc to an amplifier (not shown) or the like in the exterior through the interface 71 as an output signal So.

In this case, with respect to the synchronized signal Scl to be compared with a reference clock in the phase comparator 51, a band pass signal Sbp including the synchronized signal in association with the frequency of the wobbling of the above described groove track 2 is extracted from the amplified signal Sap by using the band pass filter 69. Further, the above described synchronized signal Scl having the frequency of 140 kHz in association with the above wobbling is generated from the foregoing extracted band pass signal Sbp.

In the next place, the operation for recording the contents included in the recording signal Sr, which is received and outputted in the set top box 14, in the DVD-R 1 will be explained below.

At first, the interface processing which is pre-set in the interface unit 71 is applied to the recording signal Sr Inputted in the recorder 15 (the recording signal Sr including the content to be recorded in the DVD-R 1). Then, the recording signal Sr is accumulated in the memory 68m in the CPU 68 as a processing recording signal Sri as well as it is outputted to the address detecting circuit 70.

On the other hand, prior to recording the contents, the pick up 60 irradiates the optical beam B to the pre-pit 4 on the DVD-R 1, generates the RF signal Sp in association with the foregoing pre-pit 4 and outputs it to the RF amplifier 61.

Thus, the RF amplifier 61 applies the processing such as the amplifying processing or the like to the foregoing the RF signal Sp, generates the amplified signal Sap and outputs it to the band pass filter 69.

Then, the Land pass filter 69 generates the synchronized signal in association with the frequency of the wobbling in the above described groove track 2 and the band pass signal Sbp including the block address number in association with the above described pre-pit 4 from the amplified signal Sap to output them to the above wobbling detecting unit 63 and the LPP detect Ing unit 64.

In the next place, the above wobbling detecting unit 63 generates the synchronization signal Scl having a frequency in association with the above wobbling from the foregoing band pass signal Sbp as same as that in the reproduction of the contents and outputs it to the phase comparator 51 and a cross talk removing unit 65.

Thus, the phase comparator 51 and the driver 52 rotate the DVD-R 1 with a pre-set rotation number by the same operation as that in the case of the above described player 12.

On the other hand, the LPP detecting unit 64, in which the band pass signal Sbp is inputted, detects the signal component in association with the above block address number from the foregoing band pass signal Sbp and outputs it to the cross talk removing unit 65 and the LPP decoder 66 as an LPP signal Slpp.

Then, the cross talk removing unit 65 removes the cross talk component caused by the pre-pit 4 from the synchronized signal Scl on the basis of the LPP signal Slpp, generates a recording clock signal Swck having a frequency as a reference upon recording the contents and outputs it to an encoder 91.

Additionally, the LPP decoder 66 analyzes the contents of the LPP signal Slpp and generates the block address number (namely, the block address number indicating a position on the DVD-R 1 on which the optical beam B is irradiated now) signal Sdl to output the generated signal Sdl to the CPU 68.

In the next place, the address detecting circuit 70 extracts the sector address number in the ID information 21 in each of the above recording sectors 40, which is included in the foregoing processing recording signal Sri, from the foregoing processing recording signal Sri to output the extracted sector address number to the CPU 68 as an address signal Sadd.

Then, the CPU temporally stores the foregoing processing recording signal Sri in the memory 68m and compares the contents of the address number signal Sdl with the contents of the address signal Sadd to output the processing recording signal Sri to the encoder 91 at the timing having a corresponding relation in which the both signals are pre-set (namely, the latter is 10h-fold as much as the former).

Thus, the encoder 91 applies the pre-set modulation processing or the like to the processing recording signal Sri on the basis of the above recording clock signal Swck and generates a modulation signal Se to output the generated modulation signal Se to a power controlling unit 92.

Then, the power controlling unit 92 generates a power controlling signal Spc and outputs it to a laser driving unit 93 so as to demodulate the intensity of the optical beam B for recording so that the optical beam B corresponds to the modulation signal Se on the basis of the controlling signal Sc from the CPU 68.

Then, the laser driving unit 93 generates a driving signal Sld for driving a semiconductor laser (not shown) in the pick up 60 for emitting the foregoing optical beam B and outputs the generated driving signal Sld to the foregoing pick up 60 so that the optical beam B is irradiated to the above groove track 2 on the DVD-R 1 with the changed intensity shown by the foregoing power controlling signal Spc.

According to the above described series of the operation, as the recorder 15, the laser driving unit 93 is capable of recording the contents (a recording sector 40) in association with a sector address number, which is included in the foregoing address signal Sadd, in a recording position on the DVD-R 1 in which the address number signal Sdl in association with the address signal Sadd is obtained.

In the next place, the total flow of the recording processing for recording the above described contents in the DVD-R 1 will be described in detail with reference to FIGS. 10 and 11. The recording processing to be described below comprises the processing to be mainly controlled and processed by the CPU 68.

As shown in FIG. 10, in the foregoing recording processing, at first, it is monitored whether or not the address signal Sadd is inputted, so that it is confirmed that the input of the recording signal Sr is started and the sector address number of a head in the inputted contents is detected (step S1).

In the next place, the irradiation position of the optical beam B for recording is moved to a position of the block address number (this block address number is referred to as "T" and it is stored in another memory (not shown) in the CPU 68) having the above corresponding relation with the above detected sector address number (step S2) Here, it is assumed that the foregoing irradiation position is moved to a position represented by the mark "✕" in FIG. 11 by this processing.

Further, in this state, it is monitored whether or not a head of the ECC block 30 in the contents is detected (step S3). If it is not detected (step S3; NO), the monitor of the contents has been continued. On the other hand, if the foregoing head is detected (step S3; YES) then, filling the inputted contents in the memory 68m is started (step S4).

In the next place, it is monitored whether or not the memory 68m is filled (step S5). If it is not filled (step S5; NO), the filling has been continued. On the other hand, if it is filled (step S5; YES), the recording of the contents in the foregoing memory 68m in the DVD-R 1 is started (step S6).

In the recording processing in the consents in this step S6, as shown in a third part from above in FIG. 11, the contents are recorded toward the outer radius of the DVD-R 1 from the position of T in the block address number detected in the step S2. As the foregoing recording manner of the foregoing content in this case, as shown in the lowest part in FIG. 5, the contents have been recorded for every sync frame 42.

Alternatively, as shown in FIG. 1, in the foregoing recording processing, the above synchronized information SY is also formed and recorded every when one recording sector 40 is formed and recorded.

Then, in the recording processing in the step S6, it is monitored whether or not the last (the outermost radius side) block address number on the DVD-R 1 is detected (step S7).

Further, if the last block address number is not detected (step S7; NO), the recording processing has been continued since the recording of the contents is still capable of being continued in the recording area DA in the DVD-R 1. On the other hand, if the last block address number is detected (namely, if the contents having the corresponding sector address number have been recorded till the position of the block address number in the outermost radius side in the recording area DA (step S7; YES), then, the recording is temporarily stopped (step S8). Further, the irradiation position of the optical beam B is moved to the innermost radius side of the recording area DA (step S9) and the recording processing, which is stopped after The irradiation position of the optical beam B is moved, is restarted (step S10). According to this processing, as shown in a forth part from above in FIG. 11, the contents have been continuously recorded from the innermost radius side of the recording area DA.

In the next place, after the recording processing is restarted, it is monitored whether or not the block address number "T", which is stored when the recording is started in the above step S2, is detected again (step S11).

Then, if the detected block address number is not "T" (step S11; NO), since the contents have not been recorded till a recording position shown by the mark "✕" in FIG. 11 (namely, the recording of the contents is not completed in the DVD-R 1), the recording processing has been continuously performed toward the outer radius side (step S10). On the other hand, if the block address number "T" is detected (step S11; YES), the recording is terminated since the recording of the contents in the DVD-R 1 has been completed (step S12). Further, as shown form the lowest part to the third part from the lowest part in FIG. 11, lead-out data LOD as termination information or the like to be recorded in lead-out area LO, lead-in data LID as start information or the like to be recorded in a lead-in area LI and file system information FAD as file information or the like to be recorded in a file system information area FA are recorded in an area on the DVD-R 1 in association with the data or the information, respectively (step S13), so that the all recording processing has been terminated.

In this case, according to the file system forming processing in the step S13, a file system is formed when a head of the contents is not a sector address number in which the recording is started (a sector address number in association with a position represented by the mark "✖" in FIG. 11) but it is a sector address number corresponding to the innermost radius side of the recording area DA. Further, describing that a sector address number corresponding to (a sector address number in association with the foregoing mark "✖"–1h) is connected to a sector address number in association with the foregoing mark "✖", the file system is formed.

After the above described recording processing has been terminated, as shown in the lowest part in FIG. 11, the contents starting from the mark "✖" position in FIG. 11 (corresponding to the block address number "T") have been continuously recorded till the outermost radius side of the recording area DA. Then, it is continuously recorded from the innermost radius side of the recording area DA. When it is recorded in the foregoing mark "✖" position, the series of the recording of the content has been terminated.

As described above, according to the operation of the contents distributing system S of the first embodiment, the sector address number in the contents to be recorded is distributed together with the contents, so that the contents are capable of being recorded so as to be reproduced on the code of the original configuration order even when the recording is started from the midstream of the foregoing contents to be distributed upon recording the foregoing contents in the DVD-R 1.

Alternatively, since the contents and the sector address number are distributed through the Internet lines IN, it is possible to rapidly and reliably distribute the contents and the sector address number even when the outputting apparatus 10 and the recording apparatus 11 are placed with a distance.

Further, the contents recorded in the DVD 72 is reproduced and distributed as it is and the reproduction controlling information in the foregoing contents is also distributed together with the sector address number in the recording apparatus 11, so that it is possible to reproduce the contents in various manners on the basis of the foregoing reproduction controlling information upon reproducing the contents after outputting them to the recording apparatus 11 and recording them in the DVD-R 1.

Alternatively, according to the above described first embodiment, the case that the Internet lines IN is used as a circuit to connect the outputting apparatus 10 and the recording apparatus 11 is explained. However, other than this case, the outputting apparatus 10 and the recording apparatus 11 may be connected by any one of or not less than two of a cable television circuit, a satellite broadcasting circuit and around-based digital broadcasting circuit.

As a recording medium on the recorder 15, a DVD-RW (DVD-Re-Recordable) capable of writing plural times or a DVD-RAM (DVD-Random Access Memory) may be used in addition to the DVD-R 1. Further, as a recording medium which is filled in the player 12, the DVD-R, the DVD-RW or the DVD-RAM, which has been already recorded, may be used in addition to the DVD 72 for reproducing only.

(II) Second Embodiment

Next, a second embodiment, which is another embodiment according to the present invention, will be explained with reference to FIGS. 12 to 14.

Figure 12:
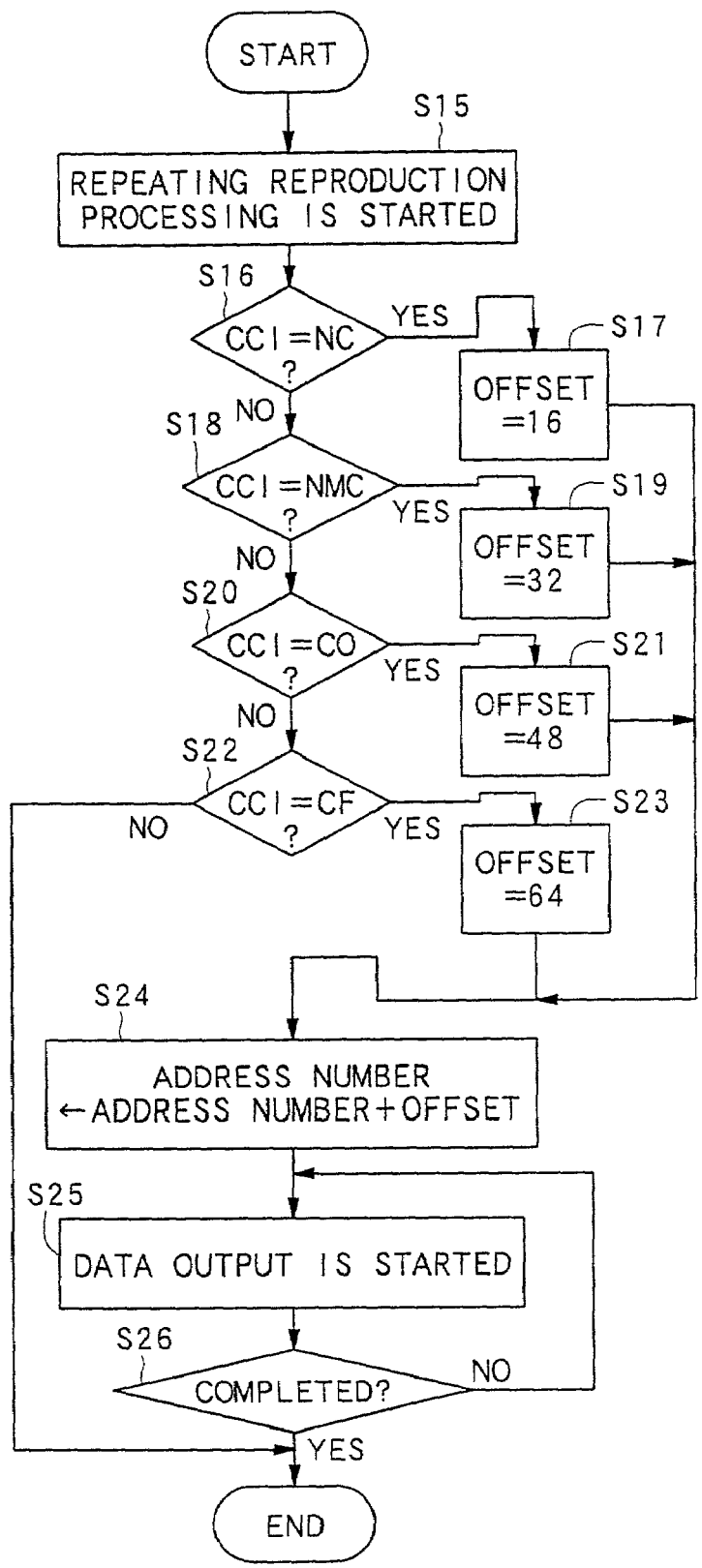
FIG. 12 is a flow chart for showing a recording processing of a second embodiment of the present invention.

FIG. 12 is a flow chart for showing a reproduction processing of a player of the second embodiment of the present invention. FIG. 13 is a diagram for showing a recording processing of a recorder of the second embodiment. FIG. 14 is a flow chart for showing a reproduction processing of the foregoing recorder according to the second embodiment.

In the above described first embodiment, the case is described that the contents recorded in the DVD 72 are distributed as it is together with the sector address number to be recorded in the DVD-R 1. However, according to the second embodiment to be described below, the contents are distributed after a so-called illegal copy preventing processing is applied to protect the contents, which is illegally obtained and copied between the outputting apparatus and the recording apparatus, from being illegally reproduced.

At first, a reproduction processing of the contents to be carried out in a player of the second embodiment will be explained with reference to FIG. 12.

It is assumed that CCI (Copy control Information) data, which is controlling information for regulating the numbers of times of recopy after the foregoing contents are copied once, is included in the contents to be reproduced by the player according to the second embodiment by a publicly known method such as a water mark technique or the like. In this case, as the contents of the foregoing CCI data, a copy prohibition data for prohibiting a copy (hereinafter, the foregoing copy prohibition data is referred to as NC (Never Copy) information), recopy prohibition data for prohibiting a copy more than once (hereinafter, the foregoing recopy prohibition data is referred to as NMC (No More Copy) information), permission data for permitting a copy only once (hereinafter, the foregoing permission data is referred to as CO (Copy Once) information) and permission data for permitting a copy in any numbers of times (hereinafter, the foregoing permission data is referred to as CF (Copy Free) information) are considered.

As shown in FIG. 12, at first, the repeating reproduction processing is started as same as the first embodiment in the reproduction processing in the player of the second embodiment (step S15). Then, the CCI data included in the foregoing contents to be reproduced is detected and it is determined whether or not the content of the CCI data is the NC information (step S16).

If it is the NC information (step S16; YES), an offset value for uniformly shifting the sector address number in the contents in the step S24 to be described later is shifted to the foregoing step S24 as "16h" (step S17).

On the other hand, in the determination of the step S16, if the CCI data is not the NC information (step S16; NO), then, it is determined whether or not the content in the foregoing CCI data is the NMC information (step S18) If it is the NMC information (step S18; YES), the above offset value is shifted to the step S24 as "32h" (step S19).

On the other hand, in the determination in the step S18, if the CCI data is not the NMC information (step S18; NO), then, it is determined whether or not the content of the foregoing CCI data is the CO information (step S20)

Further, it is the CO information (step 20; YES), the above offset value is shifted to the step S24 as "48h" (step S21).

On the other hand, in the determination of the step S20, if the CCI data is not the CO information (step S20 NO), then, it is determined whether or not the content of the foregoing CCI data is the CF information (step S22).

Further, if it is the CF information (step S22; YES), the above offset value is shifted to the foregoing step S24 as "64h" (step S23).

On the other hand, in the determination of the step S22, if the CCI data is not the CF information (step S22; NO), there is a possibility such that the CCI data is tampered, so that the reproduction processing itself is stopped so as to protect the illegal copy.

If each offset value is set (steps S17, S19, S21, S23), a value such that the offset value is added to each sector address number included in the contents is determined as a new sector address number (step S24), then, the contents including the new sector address number are outputted to the Internet lines IN (step S25).

Further, it is determined whether or nor the reproduction Processing of the all content is completed (step S26). If it is not completed (step S26; NO), the processing returns to the step S26 to continue the output of the content. On the other hand, if it is completed (step 26; YES), the reproduction processing is completed as it is.

Then, a recording manner in the case that the contents outputted from the outputting apparatus of the second embodiment are recorded in the DVD-R 1 by the same recording processing as that of the first embodiment (see FIG. 10) will be explained with reference to FIG. 13.

Figure 13:
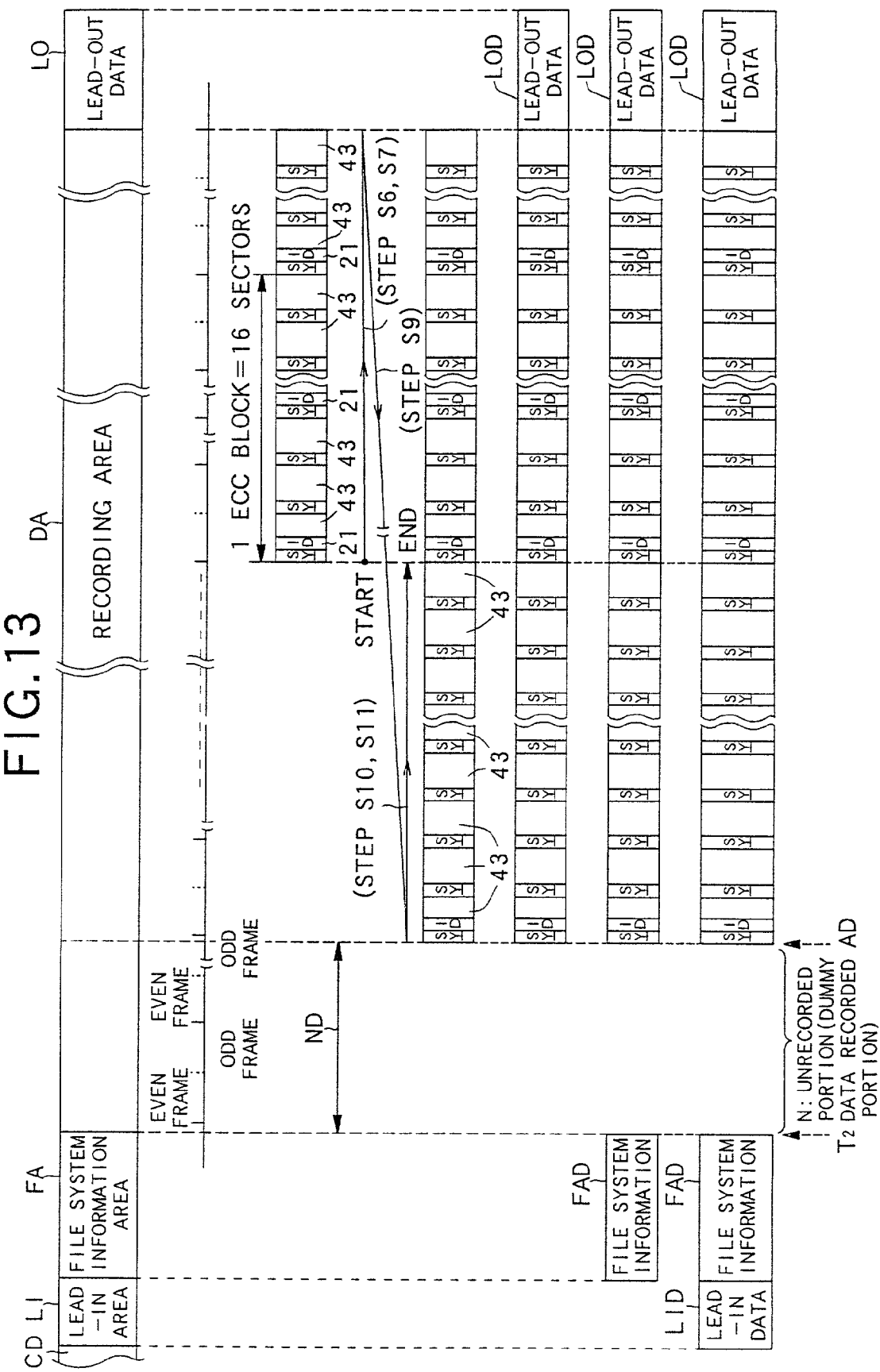
FIG. 13 is a diagram for showing a recording manner of the second embodiment.
Figure 14:
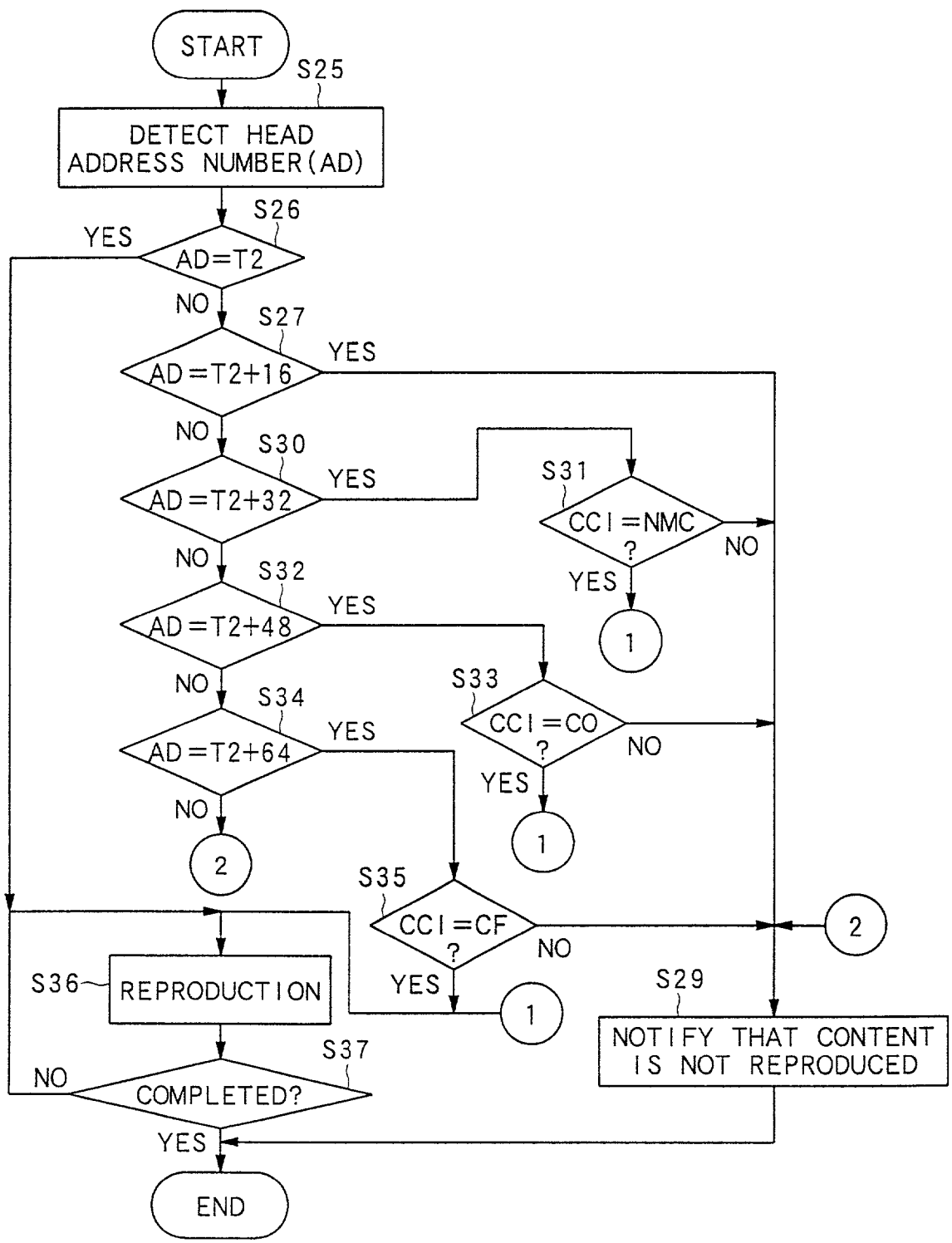
FIG. 14 is a flow chart for showing a reproduction processing of the second embodiment.

In the case that the contents, which are reproduced and outputted by the reproduction processing shown in FIG. 12, are recorded in the DVD-R 1 as same as the recorder 15 of the first embodiment, the sector address number in the content is uniformly shifted as described above, so that, according to the recording processing as a result thereof, the contents are recorded as same as the first embodiment with an unrecorded portion N with a length ND is remained in a head of a recording area DA as shown in FIG. 13.

In this case, the length ND of the unrecorded portion N becomes the length equivalent to the length of sixteen sector address numbers when the offset value on the reproduction is "16h". Further, when the offset value on the reproduction is "32h", it becomes the length equivalent to the length of thirty-two sector address numbers, when the offset value on the reproduction is "48h", it becomes the length equivalent to the length of forty-eight sector address numbers and when the offset value on the reproduction is "64h", it becomes the length equivalent to the length of sixty-four sector address numbers.

In this case, the foregoing unrecorded portion N is an obstacle upon reproduction, so that, for example, dummy data comprising zero-data is recorded in the unrecorded portion N in actual and the foregoing unrecorded portion N becomes the dummy data recorded portion N in the last processing of the step S13 in the above recording processing.

In the next place, the processing for reproducing the contents recorded in the DVD-R 1 in the recorder of the second embodiment while providing the illegal copy protection processing as described above will be explained with reference to FIG. 14.

In the reproducing processing in the foregoing recorder, at first, a sector address number in a headmost position of the contents recorded in the DVD-R 1 is detected (step S25). Here, it is assumed that the foregoing detected sector address number is "AD" (see the lowest part of FIG. 13).

Then, it is determined whether or not the foregoing detected sector address number "AD" corresponds to the block address number in the outermost radius side of the file system information area FA in the SVS-R1 (step S26) In this case, the block address number of the foregoing outermost radius side is defined as "T2".

Further, if the sector address number "AD" and the block address number "T2" are in the original corresponding relation (namely, the sector address number "AD" is ten-times as much as the block address number "T2" in hex)(step S26; YES), it is perceived that the unrecorded part N does not exist in the DVD filled in the recorded of the second embodiment at the present time. Therefore, in this case, the foregoing DVD is deemed as a so-called original DVD for reproducing only, so that the processing shifts to the reproduction processing as it is (step S36).

On the other hand, if the sector address number "AD" and the block address number "T2" are not in the original corresponding relation in the determination of the step S26 (step S26; NO), then, it is determined whether or not the sector address number "AD" and the value obtained by adding "16h" to the block address number "T2" are in the original corresponding relation (step S27).

Then, if the sector address number "AD" and the value obtained by adding "16h" to the block address number "T2" are in the original corresponding relation (step S27; YES), it is deemed that the contents in association with the NC information are copied at this point of time. However, the copying of the NC information is an illegal behavior, so that the processing shifts to the processing for notifying a user that the content is not reproduced (step S29). After that, the reproduction processing is terminated.

In the next place, if the sector address number "AD" and the value obtained by adding "16h" to the block address number "T2" are not in the original corresponding relation in the determination of step S27 (step S27; NO), then, it is determined whether or not the sector address number "AD" and the value obtained by adding "32h" to the block address number "T2" are in the original corresponding relation (step S30).

If the sector address number "AD" and the value obtained by adding "32h" to the block address number "T2" are in the original corresponding relation (step S30; YES), then, it is determined whether or not the CCI data in the content, which is detected at the present time, is the NMC information (step S31).

Thus, if the CCI data is the NMC information (step S31; YES), it is determined that the length of the unrecorded portion N and the content of the CCI data are in a normal relation. As a result, the processing shifts to a normal reproduction processing (step S36).

On one hand, if the CCI data is not the NMC information in the determination of the step S31 (step S31; NO), it is deemed that there is a strong possibility that the length of the unrecorded portion N and the content of the CCI data are not in the normal relation and the contents in the process of the reproduction at the present time are illegally copied. As a result, the user is notified that the contents are not reproduced (step S29) and the reproduction processing is terminated.

On the other hand, the sector address number "AD" and the value obtained by adding "32h" to the block address number "T2" are not in the original corresponding relation (step S30; NO), then, it is determined whether the sector address number "AD" and the value obtained by adding "48h" to the block address number "T2" are not in the original corresponding relation (step S32).

Further, if the sector address number "AD" and the value obtained by adding "48h" to the block address number "T2" are in the original corresponding relation (step S32; YES), then, it is determined whether or not the above CCI data is the CO information (step S33).

Thus, if the CCI data is the CO information (step S33; YES), it is deemed that the length of the unrecorded portion N and the content of the CCI data are in the normal relation. As a result, the processing shifts to a normal reproduction processing (step S36).

On one hand, if the CCI data is not the CO information in the determination of the step S31 (step S33; NO), it is deemed that there is a strong possibility that the length of the unrecorded portion N and the content of the CCI data are not in the normal relation and the contents in the process of the reproduction at the present time are illegally copied. As a result, the user is notified that the contents are not reproduced (step S29) and the reproduction processing is terminated.

On the other hand, if the sector address number "AD" and the value obtained by adding "48h" to the block address number "T2" are not in the original corresponding relation (step S32; NO), then, it is determined whether or not the sector address number "AD" and the value obtained by adding "64h" to the block address number "T2" are not in the original corresponding relation (step S34).

Further, if the sector address number "AD" and the value obtained by adding "64h" to the block address number "T2" are in the original corresponding relation or not (step S34; YES), then, it is determined whether or not the CCI data in the contents detected at the present time is the CF information (step S35).

Thus, if the CCI data is the CF information (step S35; YES), it is deemed that the length of the unrecorded portion N and the content of the CCI data are in the normal relation. As a result, the processing shifts to a normal reproduction processing (step S36).

On one hand, if the CCI data is not the CF information in the determination of the step S35 (step S35; NO), it is deemed that there is a strong possibility that the length of the unrecorded portion N and the content of the CCI data are not in the normal relation and the contents in the process of the reproduction at the present time are legally copied. As a result, the user is notified that the contents are not reproduced (step S29) and the reproduction processing is terminated.

On the other hand, if the sector address number "AD" and the value obtained by adding "64h" to the block address number "T2" are not in the original corresponding relation in the determination of the step S34 (step S34; NO), it is deemed that there is a strong possibility that the contents in the process of the reproduction at the present time are illegally copied. As a result, the user is also notified that the content is not reproduced (step S29) and the reproduction processing is terminated.

Further, in the reproduction processing (step S36), it is monitored whether or not all the contents are completely reproduced (step S37). If it is not completed (step S37; NO), the reproduction has been continued till it is completed. If it is completed (step S37; YES), the reproduction processing is terminated as it is.

As described above, according to the contents distributing system of the second embodiment, the CCI data is included in the contents in addition to the effect of the operation by the contents distributing system S of the first embodiment and each sector address number is uniformly changed in association with the content of the foregoing CCI data. Further, the foregoing changed sector address number is outputted to the recording apparatus together with the content. Upon reproducing the contents recorded in the DVD-R 1 by the recording apparatus, the contents are reproduced after confirming a combination of the foregoing CCI data and the changed sector address number, so that it is possible to prevent the contents, which are illegally copied, from being illegally reproduced.

Alternatively, according to the above described second embodiment, the configuration such that the sector address number on a starting position on the DVD-R 1 is offset is explained. However, in addition to this, the sector address number may be offset upon transmission.

(III) Third Embodiment

In the next place, a third embodiment, which is another embodiment according to the present invention, will be explained with reference to FIG. 15.

Alternatively, FIG. 15 is a flow chart for showing the recording processing in a recorder according to the third embodiment.

According to the above described first embodiment, it is explained that the contents recorded in the DVD 72 are distributed together with the sector address number as it is and the contents are recorded in a position of the block address number in association with the DVD-R 1. However, according to the third embodiment to be described below, the recording of the contents are started from a head of the recording area DA in the DVD-R 1 having no relation to the content of the sector address number to be distributed.

In the next place, the content recording processing to be carried out in the recorder according to the third embodiment will be explained with respect to FIG. 15.

According to the recording processing of the third embodiment, at first, it is determined whether or not the distribution of the contents from the outputting apparatus is started (step S40). If it is not distributed (step S40; NO), the user may wait until it is distributed. On the other hand, if the distribution is started (step S40; YES), a head sector address number in the foregoing distribution is stored in a memory (not shown) in the CPU 68 (step S41) so that the contents distributed in the memory 68m have been accumulated.

Then, if the contents have been accumulated up to a preset amount of accumulation, then, the sector address number in the foregoing accumulated contents is converted in ascending order from a starting point, i.e., the sector address number in association with a head of the recording area DA (specifically, "30000h") (step S42).

In the next place, it is determined whether or not the reproduction controlling information for controlling the reproduction manner of the foregoing contents (more specifically, for example, a so-called PGCI (Program Chain Information) or the like in the DVD standard) is included in the foregoing accumulated contents (step S43).

Further, if the reproduction controlling information is included in the foregoing accumulated contents or not (step S43; YES), the sector address number included in this reproduction controlling information is converted so as to correspond to the changed sector address number in the above step S42 (step S44). Then, the processing shifts to the step S45.

On the other hand, if the reproduction controlling information is not included in the contents in the step S43 (step S43; NO), the processing shifts to the step S45 as it is.

Then, in the step S45, the contents, which are distributed (steps S40; YES) and of which sector address number is converted (step S42; S44), are recorded from the head of the recording area DA in the DVD-R 1 in sequence (step S45).

Further, it is monitored whether or not the contents in association with the sector address number stored in the step S41 during the foregoing recording are distributed again (step S46). If it is not distributed again (step S46; NO), the processing returns to the step S42 so as to repeat the above described operation with respect to the contents which have been continuously distributed. On the other hand, if the contents including the same recorded contents are distributed again (step S46; YES), it is deemed that a series of recording of the contents is terminated, so that the recording is terminated (step S47). Further, as well as the step S13 in FIG. 10 according to the first embodiment, lead-out data LOD, lead-in data LID and file system information FAD are recorded in an area on the DVD-R 1 in association with the data or the information, respectively (step S48) and the all recording processing is terminated.

As described above, according to the processing of the recorder of the third embodiment, the contents are recorded while converting the content of the reproduction controlling information on the basis of the sector address number which has been repeatedly distributed, so that it is possible to record the contents so as to be reproduced by the original reproduction manner from the head of the DVD-R 1.

Alternatively, a program in association with the above described recording processing or the reproduction processing is recorded in an information recording medium such as a flexible disk or a hard disk and this recorded program is executed by a personal computer or the like, so that it may be possible to make the foregoing personal computer function as a recorder or a player in respective embodiments.

Additionally, according to the above described respective embodiments, the case is explained such that the recording sectors 40 are aligned from the ID information 21 shown in a second part from the top in FIG. 5 as a head in the reproduction signal Sd to be outputted from the outputting apparatus 10 to the recording apparatus 11 through the Internet IN. However, in addition to this, the reproduction signal Sd may be formed in a manner shown a second part from the bottom or the lowest part in FIG. 5 (namely, the reproduction signal Sd is formed in a manner equivalent to the manner of the RF signal) so that this reproduction signal Sd is outputted to the Internet IN.

Further, a transmission rate upon outputting the reproduction signal Sd from the outputting apparatus 10 to the recording apparatus 11 may be determined so that the reproduction signal Sd is capable of being transmitted with a high speed not less than double speed.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-187355 filed on Jun. 22, 2000 including the specification, claims, drawings and summary is incorporated herein by reference in its entirety.

What is claimed is:

1. An information outputting apparatus for reading out main information from a recording medium and outputting the main information to an external apparatus to record the main information in an optical recording medium in the external apparatus, comprising:

an outputting device for outputting the main information including a plurality of partial information and recording position information showing a recording position of the partial information on the optical recording medium on which the partial information is to be recorded, wherein the outputting device cyclically outputs the whole of the same main information by repeatedly returning to the beginning of the main information when the end thereof is reached, wherein in each session of outputting the whole of the same main information, the outputting device sequentially outputs the partial information and the recording position information in accordance with an order of recording or reproducing, and wherein the recording position information comprises sector address information set in advance in the optical recording medium.

2. The information outputting apparatus according to claim 1, wherein each of the recording position information being added to each of the partial information.

3. An information outputting method for reading out main information from a recording medium and outputting the main information to an external apparatus to record the main information in an optical recording medium in the external apparatus, comprising:

an outputting process for outputting the main information including a plurality of partial information and recording position information showing a recording position of the partial information on the optical recording medium on which the partial information is to be recorded, wherein the outputting process cyclically outputs the whole of the same main information by repeatedly returning to the beginning of the main information when the end thereof is reached, and in each session of outputting the whole of the same main information, the outputting process sequentially outputs the partial information and the recording position information in accordance with an order of recording or reproducing, wherein the recording position information comprises sector address information set in advance in the optical recording medium.

4. An output apparatus for reading out contents from a recording medium and outputting the contents for distribution to a recording apparatus to record the contents in an optical recording medium in the recording apparatus, the output apparatus comprising:

an outputting section for repeatedly outputting an entire information unit comprising a plurality of information pieces by repeatedly returning to the beginning of the information unit when the end thereof is reached, each information piece being output with associated recording position information indicative of that information piece's recording position on the optical recording medium on which the partial information is to be recorded; and a transmitting section for transmitting the information pieces and associated recording position information to a recording apparatus for recording the information pieces onto the optical recording medium in accordance with the recording position information, wherein the recording position information comprises sector address information set in advance in the optical recording medium.

5. An information outputting apparatus for reading out main information from a recording medium and outputting the main information to an external recording apparatus to record the main information in an optical recording medium in the external recording apparatus, the information outputting apparatus comprising:

an outputting device for outputting the main information to the external recording apparatus, the main information including a plurality of partial information and recording position information showing a recording position of the partial information on the optical recording medium on which the partial information is to be recorded, wherein the outputting device cyclically outputs the whole of the main information by repeatedly returning to the beginning of the main information when the end thereof is reached, wherein in each session of outputting the whole of the main information, the outputting device sequentially outputs the partial information and the recording position information in accordance with an order of recording or reproducing, and wherein the recording position information comprises sector address information set in advance in the optical recording medium.

6. The information outputting apparatus according to claim 5, wherein each of the recording position information is added to each of the partial information.

7. An information outputting method for reading out main information from a recording medium and outputting the main information to an external recording apparatus to record the main information in an optical recording medium in the external recording apparatus, the information outputting method comprising:

an outputting process for outputting the main information to the external recording apparatus, the main information including a plurality of partial information and recording position information showing a recording position of the partial information on the optical recording medium on which the partial information is to be recorded, wherein the outputting process cyclically outputs the whole of the main information by repeatedly returning to the beginning of the main information when the end thereof is reached, and in each session of outputting the whole of the main information, the outputting process sequentially outputs the partial information and the recording position information in accordance with an order of recording or reproducing, wherein the recording position information comprises sector address information set in advance in the optical recording medium.

* * * * *